(12) United States Patent
Nicholson et al.

(10) Patent No.: US 11,692,552 B2
(45) Date of Patent: Jul. 4, 2023

(54) FLOW TESTING METHODS AND SYSTEMS

(71) Applicant: ATS Corporation, Cambridge (CA)

(72) Inventors: Kenneth Wayne Nicholson, Cambridge (CA); Philip David Munroe, Cambridge (CA); Mathieu Jocelyn Giles Pascal Gaudreault, Cambridge (CA); Martin George Smith, Cambridge (CA); David Andrew Tait, Cambridge (CA); Robert David Almas, Cambridge (CA); Colin Spencer Quelch, Cambridge (CA)

(73) Assignee: ATS Corporation

( * ) Notice: Subject to any disclaimer, the term of this patent is extended or adjusted under 35 U.S.C. 154(b) by 0 days.

(21) Appl. No.: 17/706,123

(22) Filed: Mar. 28, 2022

(65) Prior Publication Data

US 2022/0316482 A1 Oct. 6, 2022

Related U.S. Application Data

(60) Provisional application No. 63/169,023, filed on Mar. 31, 2021.

(51) Int. Cl.
*F04D 15/00* (2006.01)
*G01M 3/28* (2006.01)
*F15B 19/00* (2006.01)
*F04B 51/00* (2006.01)

(52) U.S. Cl.
CPC .......... *F04D 15/0088* (2013.01); *F04B 51/00* (2013.01); *F15B 19/005* (2013.01); *G01M 3/2876* (2013.01)

(58) Field of Classification Search
CPC .............. F04D 15/0088; F15B 19/005; G01M 3/2876; F04B 51/00
USPC .......................................................... 73/168
See application file for complete search history.

(56) References Cited

U.S. PATENT DOCUMENTS

| | | | | |
|---|---|---|---|---|
| 4,184,367 A | * | 1/1980 | Jenney | G01M 99/00 73/198 |
| 2017/0227946 A1 | * | 8/2017 | Nicholson | B23P 21/004 |

FOREIGN PATENT DOCUMENTS

WO    WO2014078938 A1    5/2014

* cited by examiner

*Primary Examiner* — Nathaniel T Woodward
(74) *Attorney, Agent, or Firm* — Valauskas Corder LLC

(57) ABSTRACT

Systems and methods of flow testing different workpieces in an automated testing station are described. Each workpiece comprises a flow path from an inlet to an outlet and the automated testing station comprises first and second sealing heads for injecting gas into the inlets of workpieces and collecting gas from the outlets of workpieces. The method includes performing a flow test by moving the flow test heads toward the workpieces while at the same time priming a flow of gas from the first sealing heads to the second sealing heads, prior to engaging the workpiece.

20 Claims, 19 Drawing Sheets

FLOW TESTING METHODS AND SYSTEMS

CROSS-REFERENCE TO PREVIOUS APPLICATION

This application claims priority from U.S. patent application No. 63/169,023 filed on Mar. 31, 2021, which is incorporated herein by reference in its entirety.

FIELD

The disclosure relates to automated assembly and testing of components. In particular, the disclosure relates to systems and methods for flow testing components.

INTRODUCTION

Manufacturing of products includes the automated creation and testing of parts, and the assembly of the finished product from parts. In the following description the term "component" is chosen as a general term to describe individual parts, an assembly of parts, materials such as adhesives, weld consumables or plastic to be molded, and the final product of a manufacturing process.

WO2014078938A1 describes methods of manufacturing using computer numerically controlled drives to move and process components through various stages where the timing, position, orientation, linear or rotary velocity, and acceleration of the components and devices that deliver/receive components are matched. Computer numerical control (CNC) of linear or drives, actuators, sensors and other devices is coordinated through programming known as "electronic camming".

Electronic camming coordinates the actuation of multiple mechanisms through electronic controls and software. The mechanisms need not physically interact and synchronization of their motions is electronically controlled with extreme accuracy and flexibility through software interaction. Electronic camming links movements of devices through electronic means (i.e. software), conceptually in the same manner that gears, linkages, and timing chains link movements of mechanical devices together, with enhanced accuracy, control and design flexibility.

An application of electronic camming in the processing of single components or assembling of multiple components together is described in international publication WO2014078938A1 that can be summarized as follows. A first component is loaded, separated from an intake stream and accelerated. The component is delivered at a predetermined delivery time, delivery position, delivery speed and moving along a delivery trajectory to be delivered to and received by a processing tool that is also moving. The motions of the delivery device and the processing tool receiving of the component are electronically synchronized. The transfer of the component from one device to the other is coordinated and timed electronically. Through the processing or assembly process, the actuators that move the devices to handle the component are electronically cammed and synchronized together.

The same concept can be applied to each stage of a manufacturing process where separate devices have their motions coordinated through electronic camming and CNC program software. Manufacturing involves storage of material/components, motion control, and processing of material/components, for example: molding, forming, cutting, bonding, welding, stamping, dispensing, assembling, fastening; as well as inspecting, testing, measuring and rejecting failed material/components.

Flow testing is often an important validation of product integrity. In particular, it is often required to test components having functional orifices for cracks, breaks, blockages, flow rates and/or diameter sizes. Examples of such components include, but are not limited to, spray actuators for dispensing bottles. Such tests are critical to ensuring that the components produced by a given manufacturing process operate within precise functional parameters. One method of testing such components is by way of flow testing, which involves generating a predetermined flow of gas (e.g., air) at the inlet of the orifice of a component and measuring the resulting flow of gas at the outlet of the orifice. The flow measured at the outlet can be compared to a threshold or expected value in order to identify the presence of cracks, breaks or blockages in the component, and/or to assess the diameter of the orifice and proper flow rates.

While known methods and apparatus of flow testing are effective in establishing the presence of manufacturing variability and/or defects, they are generally costly in terms of productivity. Because of the difficulties relating to incorporating flow testing into inline production processes, flow tests are typically performed offline in batch processes. When performed inline, flow tests are typically implemented using a large number of complex tools and/or represent a significant bottleneck to production line speed.

Prior art flow testing clearly therefore fails to provide high production output inline inspection with a small footprint, low level of complexity and at low cost.

Features that distinguish the present invention from the background art will be apparent from review of the disclosure, drawings and description of the invention presented below.

SUMMARY

The following summary is intended to introduce the reader to various aspects of the applicant's teaching, but not to define any invention.

The various embodiments described herein generally relate to methods (and associated systems) for flow testing different products in an automated production station having a plurality of part-processing devices.

In one aspect of the present disclosure, there is provided a method of flow testing workpieces in an automated testing station having a plurality of processing tools. Each workpiece includes an inlet and an outlet, the inlet being in fluid communication with the outlet. The processing tools of the automated testing station include, for each workpiece to be tested, a first and second sealing head. The method comprises the steps of receiving at least one first workpiece at the automated testing station and moving the first and second sealing heads toward engagement positions. The method also comprises priming, during the moving step, a pressurized flow of gas from each of the first sealing heads to arrive at a flow threshold. The method also comprises receiving, during the moving and priming steps, at least one second workpiece at the automated testing station. Then the method comprises the step of, for each of the at least first and second workpieces, engaging the first sealing head with the inlet of the workpiece and the second sealing head with the outlet of the workpiece to form a sealed flow path from the first sealing head to the second sealing head. The method further comprises the step of measuring the flow rate of gas flowing into each of the second sealing heads.

In another aspect of the present disclosure, there is provided an automated mass production system. The automated mass production system comprises a track including a plurality of carriers where each carrier is advanceable along the track and configured to hold at least one workpiece. Each workpiece includes an inlet and an outlet, the inlet being in fluid communication with the outlet. The automated mass production system also comprises an automated testing station having a plurality of processing tools. The processing tools include, for each workpiece to be tested, a first and second sealing head. The automated mass production system further includes a control system for synchronizing operation of the carriers and the automated testing station.

The control system is configured to receive at least one first workpiece at the automated testing station and to move the first and second sealing heads toward engagement positions. The control system is also configured to prime, during the moving step, a pressurized flow of gas from each of the first sealing heads to arrive at a flow threshold. The control system is also configured to, during the moving and priming steps, receive at least one second workpiece at the automated testing station. The control system is also configured to, for each of the at least first and second workpieces, engage the first sealing head with the inlet of the workpiece and the second sealing head with the outlet of the workpiece to form a sealed flow path from the first sealing head to the second sealing head. The control system is also configured to measure the flow rate of gas flowing into each of the second sealing heads.

BRIEF DESCRIPTION OF THE DRAWINGS

The drawings included herewith are for illustrating various examples of apparatus, systems, and processes of the present specification and are not intended to limit the scope of what is taught in any way. In the drawings.

Further details of the invention and its advantages will be apparent from the detailed description included below.

DETAILED DESCRIPTION OF VARIOUS EMBODIMENTS

Various apparatus, systems, or processes will be described below to provide an example of an embodiment of each claimed invention. No embodiment described below limits any claimed invention and any claimed invention may cover apparatus, processes, or systems that differ from those described below. The claimed inventions are not limited to apparatus, systems, or processes having all of the features of any one apparatus, system, or process described below or to features common to multiple or all of the apparatus, systems, or processes described below. It is possible that an apparatus, system, or process described below is not an embodiment of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A production process can involve processing (e.g. transferring, transporting, handling, manipulating, assembling, testing, etc.) parts to produce a product. During the production process, the part requiring further processing (for example, a subcomponent or partially finished product) can be referred to as a workpiece. The workpiece can be moved through a production station among various part-processing devices that perform the various operations on the workpiece(s) in production of the product. In some examples, such production processes can utilize a large number of standard, multi-purpose, re-configurable machines for performing specific operations on the workpiece(s) in production of the product.

This description employs the terms "delivery device", "receiving device", and "completion device" merely to imply a progression of the workpiece or processing from delivery to receiving to completion. Alternative terms could be used such as first, second and third to imply the same progression.

To introduce different parts/workpieces and/or produce different products, addition of machines and/or separate processing lines may be required. In some examples, limited space in production facilities may preclude such expansion. Certain machines may also require manual reconfiguration and retooling when switching between different parts and/or products for processing, which may contribute to production overhead and inefficiencies.

Figure 1:
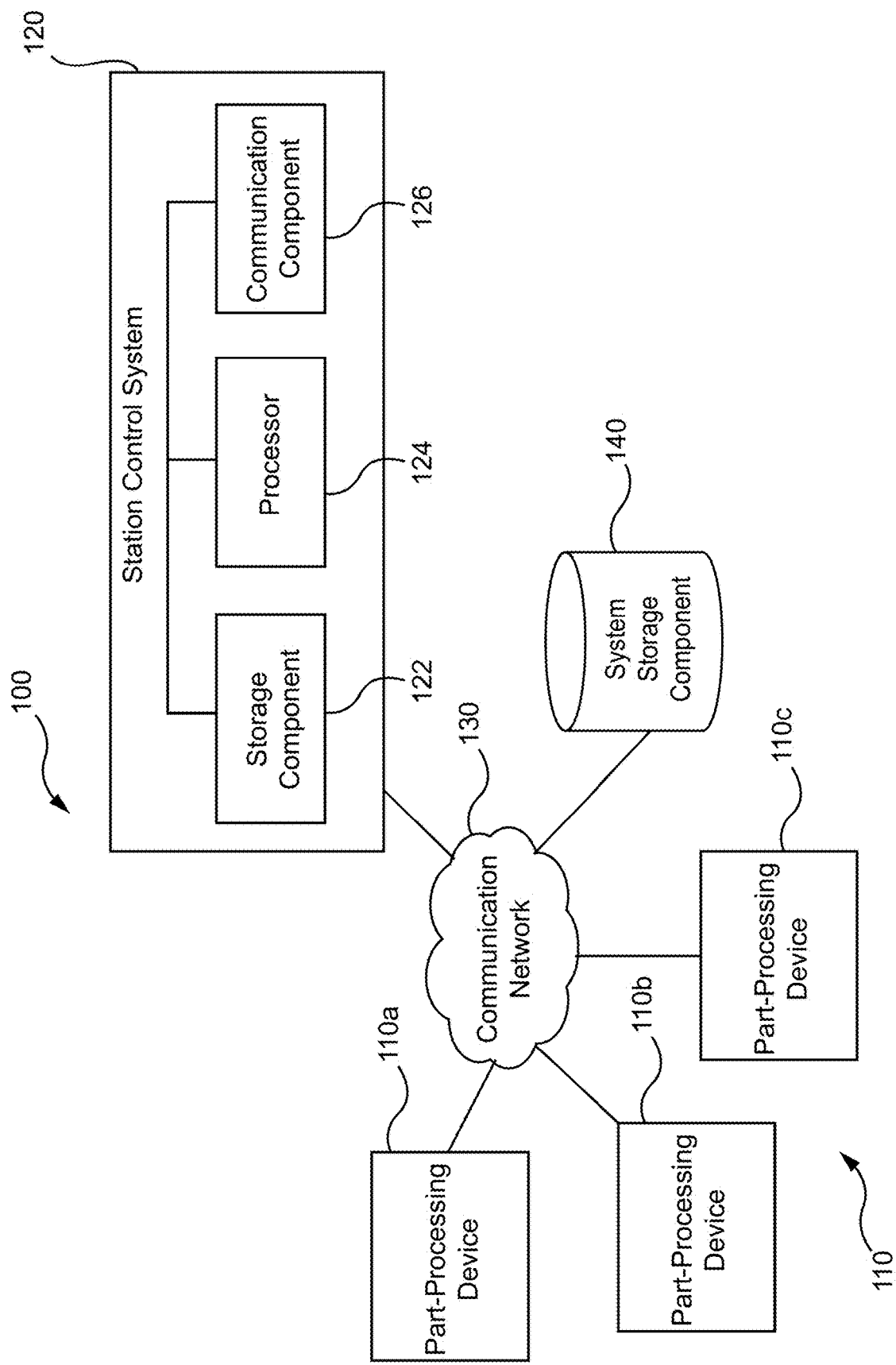
FIG. 1 is a schematic diagram of an example automated production station for mass producing and testing a plurality of different products.

Referring to FIG. 1, an example automated production station 100 is shown for producing different products. The production station 100 can include one or more part-processing devices 110, a station control system 120, a communication network 130, and a system storage component 140. The production station 100 can be a testing station, as described herein. Although only three part-processing devices 110a, 110b, and 110c are shown in FIG. 1, the automated production station 100 may include fewer or more part-processing devices 110.

The station control system 120 can include control interfaces that allow a user to electronically configure the automated production station 100. The station control system 120 can select control parameters for the part-processing device 110 to perform coordinated operations. The control parameters can be determined by the station control system 120, or received at the station control system 120 as input data. As shown in FIG. 1, the station control system 120 includes a station storage component 122, a station processor 124, and a station communication component 126.

The station storage component 122 can include RAM, ROM, one or more hard drives, one or more flash drives or some other suitable data storage elements such as disk drives. The station storage component 122 can include one or more databases for storing data related to the automated production station 100. The station storage component 122 can store data in respect of the operation of the automated production station 100, such as data in respect of the part-processing devices 110 and the coordinated operations being carried out by the part-processing devices 110.

For example, the station storage component 122 can store data received from the part-processing devices 110, data in respect of the coordinated operations delegated by the station control system 120, property data in respect of each of the part-processing devices 110, etc. The station storage component 122 can also store computer programs that are executable by the station processor 124 to facilitate communication between the station control system 120 and the part-processing devices 110, and configuration of the part-processing devices 110.

In some embodiments, the station storage component 122 can instead be the system storage component 140, which is accessible via the communication network 130.

In some embodiments, the station storage component 122 can store data that is more current based on the operation of the station control system 120, and the system storage component 140 can store data that is considered by the station control system 120 to unlikely be used in the immediate future. For example, the station storage component 122 can store operating data and part-processing property data only for the part-processing devices 110 operating during a certain production run or day, whereas the system storage component 140 can store the data for all part-processing devices 110, which is typically infrequently changed. In some embodiments, the system storage component 140 can be a third-party data storage.

The station processor 124 can control the operation of the station control system 120. The station processor 124 may be implemented any suitable processors, controllers, digital signal processors, graphics processing units, application specific integrated circuits (ASICs), field programmable gate arrays (FPGAs), microcontrollers, and/or other suitably programmed or programmable logic circuits that can provide sufficient processing power depending on the configuration, purposes and requirements of the station control system 120. In some embodiments, the station processor 124 can include more than one processor with each processor being configured to perform different dedicated tasks. The station processor 124 together with the processor at the part-processing devices 110 contribute to the control of the automated production station 100.

The station communication component 126 can include any interface that enables the station control system 120 to communicate with various devices and other systems. For example, the station communication component 126 can facilitate communication with the other components of the automated production station 100, such as the part-processing devices 110 and the system storage component 140 via the communication network 130.

The station communication component 126 can include at least one of a serial port, a parallel port or a USB port, in some embodiments. The station communication component 126 may also include an interface to component via one or more of an Internet, Local Area Network (LAN), Ethernet, Firewire, modem, fiber, or digital subscriber line connection. Various combinations of these elements may be incorporated within the station communication component 126. For example, the station communication component 126 may receive input from various input devices, such as a mouse, a keyboard, a touch screen, a thumbwheel, a track-pad, a track-ball, a card-reader, voice recognition software and the like depending on the requirements and implementation of the station control system 120.

The communication network 130 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the station control system 120, the part-processing devices 110, and the system storage component 140.

For example, each part-processing device 110 and the station control system 120 may be equipped with a wireless communication interface to enable wireless communications according to a Wi-Fi protocol (e.g. IEEE 802.11 protocol or similar).

Similar to the station storage component 122, the system storage component 140 can store information about the part-processing devices 110, including operating data, profile data (e.g., servo-motor profile data), motion data with which the part-processing devices 110 operate (e.g., tool motion data), data in respect of products that the automated production station can produce, data in respect of parts or workpieces that may be used to produce the products, and data in respect of expected or anticipated workpiece responses to flow tests.

Profile data, motion data, product data, part data, and workpiece data can be stored in the system storage component 140 for subsequent retrieval by the part-processing devices 110. The part-processing devices 110 can download motion data, product data, part data, and workpiece data from the system storage component 140 via the communication network 130, for example.

Profile data and motion data can be generated for the part-processing devices 110. For example, tables representing the profile data and motion data of tools of the part-processing devices 110 can be imported and form the basis for the profile data and motion data, respectively. In another example, the station control system 120 can generate the motion data based on data collected by the part-processing device 110.

In some embodiments, operating data can be stored in the system storage component 140, and the operating data can be retrieved by the station control system 120 when needed. The station control system 120 can download the operating data from the system storage component 140 via the communication network 130. Example operating data can include, but is not limited to, a current position of one or more tooling of the part-processing device 110, a current speed of one or more tooling of the part-processing device 110, a current velocity of one or more tooling of the part-processing device 110, and a current acceleration of one or more tooling of the part-processing device 110. In some embodiments, the operating data, or at least some of the operating data, can be stored in the station storage component 122.

In some embodiments, one or more computing devices (not shown in FIG. 1) can communicate with the automated production station 100 via the communication network 130. A user may electronically configure the automated production station 100 using the computing device. The computing device can include any device capable of communication with other devices through a network such as communication network 130. The computing device can include a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

Figure 2:
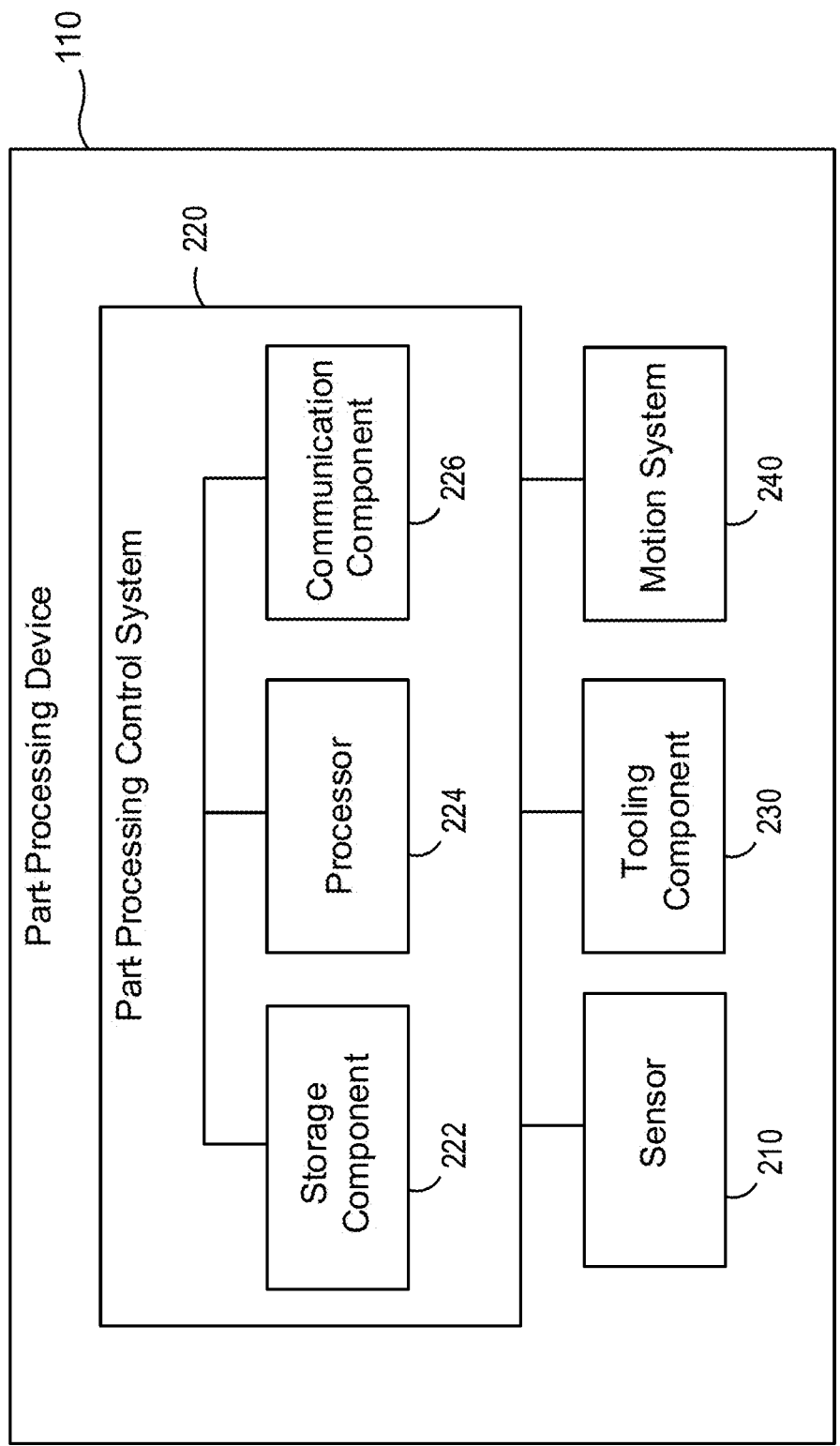
FIG. 2 is a schematic diagram of an example part-processing device for the automated production station of FIG. 1.

Reference is now made to FIG. 2, which shows a block diagram of an example part-processing device 110. The example part-processing device 110 can be part-processing devices 110a, 110b, 110c of the automated production station 100. The part-processing device 110 includes a part-processing control system 220, a sensor system 210, one or more tooling components 230, and a motion system 240.

The part-processing control system 220 can include a processor 224, a storage component (or memory) 222, and a communication component 226. The part-processing control system 220 can facilitate the operation of the part-processing device 110. The part-processing control system 220 can include control interfaces that allow a user to electronically configure the part-processing device 110. The part-processing control system 220 can collect and store motion data of the part-processing device 110 in the part-processing storage component 222.

The processor 224 can include any suitable processors, controllers, digital signal processors. microcontrollers, and/or other suitably programmed or programmable logic circuits that can provide sufficient processing power depending on the configuration, purposes and requirements of the part-processing device 110. In some embodiments, the processor 224 can include more than one processor with each processor being configured to perform different dedicated tasks.

The part-processing storage component 222 can store data to be used during the operation of the part-processing device 110 and/or to facilitate the operation of the part-processing device 110. Example data can include operating data in respect of its operation, and data in respect of parts, workpieces, or the product etc.

In some embodiments, the part-processing storage component 222 can store software applications executable by the processor 224. For example, the software application can facilitate communication with the station control system 120 and/or operation of the part-processing device 110, including components thereof such as but not limited to tooling components 230, pneumatic actuators, servo-motors, and others.

The communication component 226 can include any component for facilitating communication with the station control system 120 via the communication network 130. For example, the communication component 226 can include a wireless transceiver for communicating within a wireless communications network.

The sensor system 210 can include one or more sensors for collecting data from the environment of the part-processing device 110. For example, the sensor system 210 can include a LiDAR device (or other optical/laser, sonar, radar range-finding such as time-of-flight sensors). The sensor system 210 can include optical sensors, such as video cameras and systems (e.g., stereo vision).

The sensor system 210 can detect workpieces within a detection range. Furthermore, the sensor system 210 can detect different properties of the workpieces and generate identification data for the workpieces. The term "workpiece" and "component" used herein refers to a part or a partially finished product. Parts can have different geometric properties, such as but not limited to, different types, shapes, and sizes. The terms "different parts" and/or "different products" used herein refers to parts having such different properties and not merely a plurality of identical parts.

The part-processing device 110 can receive control parameters from the station control system 120, a control interface, or an external system. Based on the control parameters, the part-processing control system 220 can operate the part-processing device 110 to process a workpiece detected by the sensor system 210.

In some embodiments, the part-processing device 110 can be equipped with one or more tooling components 230 for engaging with workpieces detected by the sensor system 210. Tooling components 230 can be used to present a part or process a part. Example tooling components 230 can include the top and bottom sealing heads described elsewhere herein, as well as the presentation pallets also described elsewhere herein. The operation of the tooling components 230 can be controlled by the part-processing control system 220 and, in some embodiments, with consideration of the data collected by the sensor system 210.

Part-processing devices 110 can be equipped with a motion system 240 for facilitating motion of the part-processing devices 110 or components thereof, such as sensors 210 or tooling components 230. The motion system 240 can include one or more pneumatic actuators and/or servo-motors.

Figure 3:
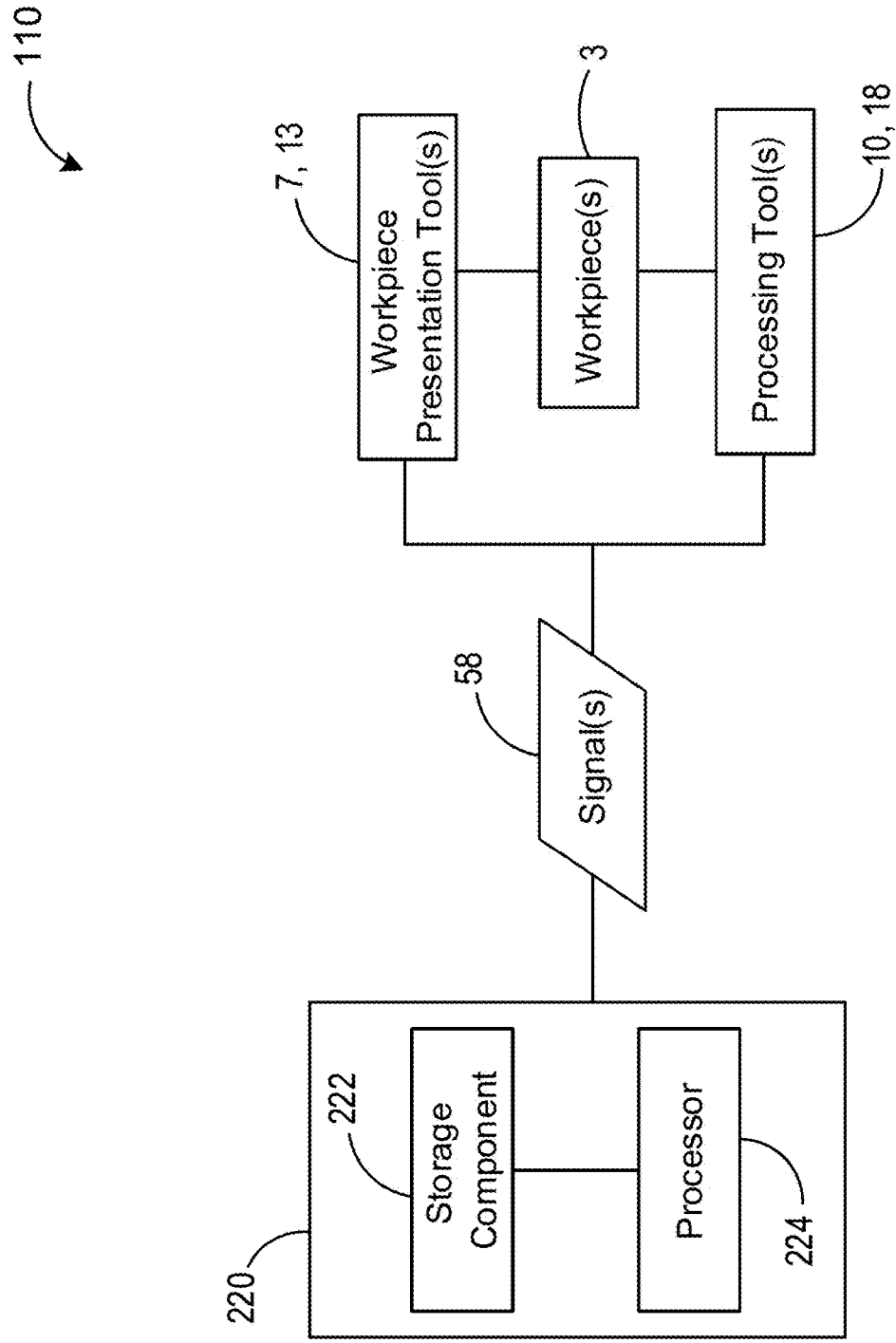
FIG. 3 is another schematic diagram of an example part-processing device for the automated production station of FIG. 1.

Reference is now made to FIG. 3, which shows another schematic diagram of part-processing device 110 for the automated production station of FIG. 1. Part-processing device 110 can handle one or more workpieces 3. As shown in FIG. 3, part-processing device 110 can include tooling components 230 such as one or more workpiece presentation tools 7, 13 and one or more processing tools 10, 18.

The presentation pallets described herein are examples of presentation tools 7, 13 and the top and bottom sealing heads described herein are examples of processing tools 10, 18.

Workpiece presentation tools 7, 13 can, for example, be a part of one or more component delivery devices. In some embodiments, workpiece presentation tools 7, 13 can include one or more screws for separating a lead component from an adjacent component. Accordingly, workpiece presentation tool 7, 13 can be configured to: load one or more workpieces 3 at an intake position at a leading end of a stream of like workpieces 3; separate workpiece 3 from the like workpieces 3; accelerate workpiece 3; and deliver workpiece 3 at a predetermined delivery time, delivery position, delivery speed and moving along a delivery trajectory. Workpiece presentation tool 7, 13 can be configured to deliver workpieces 3 before loading one or more subsequent workpieces 3 at the intake position.

Processing tools 10, 18 can, for example, be a part of one or more receiving devices. Processing tool 10 can be configured to conduct one or more value-added operation using one or more of workpieces 3. For example, processing tool 10, 18 are configured to perform flow testing on workpieces 3. In some embodiments, processing tool 10, 18 can be configured to assemble two or more of workpieces 3 together. In some embodiments, processing tool 10, 18 can include one or more of assembly tools 10, 18. Accordingly, processing tool 10, 18 can be configured to: receive one or more workpieces 3 while processing tool 10, 18 moves along a processing tool trajectory configured to permit transfer of the component(s) 3 at the delivery position from workpiece presentation tool 7, 13 to processing tool 10, 18; process workpiece 3; and move workpiece 3 to an ejection position.

Part-processing device 110 can also include one or more part-processing control systems 220. As described above, part-processing control system 220 can include one or more processors 224 and related accessories that enable control of at least some aspects of performance of workpiece presentation tool 7, 13 and/or processing tool 10, 18. Processor 224 may, for example, be configured to make decisions regarding the control and operation of part-processing device 110 and cause one or more actions to be carried out based on machine-readable instructions including those stored within part-processing control system 220 and/or other machine-readable instructions received at part-processing control system 220 via wired and/or wireless communication.

Part-processing control system 220 can also include storage component 222, such as memory(ies), memory data devices or register(s). Storage component 222 can include any storage means (e.g., devices) suitable for retrievably storing machine-readable instructions executable by processor 224 of part-processing control system 220 and other data. Storage component 222 can be non-volatile and can include erasable programmable read only memory (EPROM), flash memory, and/or other electromagnetic media suitable for storing electronic data signals in volatile or non-volatile, non-transient form. Storage component 222 can contain machine-readable instructions for execution by processor 224 and also other data related to the operation of workpiece presentation tool 7, 13 and/or processing tool 10, 18. For example, storage component 222 can hold feedback data representative of feedback signals received from one or more sensors (e.g., encoders) associated with workpiece presentation tool 7, 13 and/or processing tool 10, 18.

Machine-readable instructions stored in storage component 222 can cause part-processing control system 220 to cause the execution of various methods disclosed herein including the generation of one or more signals 58 (e.g., output data) useful in the operation of the part-processing device 110. Such machine-readable instructions can be incorporated into one or more computer program products which can be stored on suitable medium or media. In some embodiments, the machine-readable instructions can be executable by processor 224 and configured to cause processor 224 to generate signals 58 useful in the synchronization of two or more operations carried out by workpiece presentation tool 7, 13 and/or processing tool 10, 18. That is, the machine-readable instructions can be executable by processor 224 can cause the processor 224 to select control parameters for the operation of workpiece presentation tool 7, 13 and/or processing tool 10, 18 and generate signals 58 representative of the control parameters. For example, the machine-readable instructions can be configured to cause processor 224 to generate signals 58 useful in the synchronization of the delivery of workpiece 3 by workpiece presentation tool 7, 13 and the receipt of workpiece 3 by component processing tool 10, 18.

The synchronization of two or more operations of workpiece presentation tool 7, 13 and processing tool 10, 18 can effectively include electronic camming and/or electronic gearing instead of mechanical cams and/or gears used in some existing applications. In various embodiments, the use of such electronic synchronization can provide more flexibility and improved performance of part-processing device 110 in comparison with conventional systems comprising mechanical synchronization means. Accordingly, in various embodiments, storage component 222 can hold data representative of one or more cam profiles to be used in the operation of workpiece presentation tool 7, 13 and processing tool 10, 18. For example, such cam profile(s) can be in tabular form and can include corresponding positions representative of synchronized trajectories to be followed by workpiece presentation tool 7, 13 and processing tool 10, 18 during operation. In various embodiments, one of workpiece presentation tool 7, 13 and processing tool 10, 18 can be operated as a master device and the other of workpiece presentation tool 7, 13 and processing tool 10, 18 can be operated as a slave device executing movements based on the execution of movements by the master device in order to substantially maintain synchronization between the slave device and the master device. In some embodiments, part-processing device 110 can include one or more master devices and one or more respective slave devices. For example, one or more slave devices can be electronically cammed with a master device.

Accordingly, in various embodiments, the machine-readable instructions can be configured to cause processor 224 to generate signals 58 useful in causing electronic camming of the delivery of workpiece 3 by workpiece presentation tool 7, 13 and of the receipt of workpiece 3 by processing tool 10, 18. In some embodiments, the machine-readable instructions can be configured to cause processor 224 to generate signals 58 useful in causing electronic camming of the loading, separation, acceleration and delivery of workpiece 3 by workpiece presentation tool 7, 13, and, of the receipt of workpiece 3 by processing tool 10, 18.

In various embodiments, the machine-readable instructions can be configured to cause data processor to generate signals 58 useful in controlling movement of workpiece 3 along the delivery trajectory and controlling movement of processing tool 10, 18 along the processing tool trajectory. The delivery trajectory and the processing tool trajectory can be substantially tangential at the delivery position of workpiece 3. Similarly, the machine-readable instructions can be configured to cause processor 224 to generate signals 58 useful in causing the delivery speed of workpiece 3 and a speed of processing tool 10, 18 to be substantially the same when workpiece 3 is at the delivery position. Accordingly, the transfer of workpiece 3 from workpiece presentation tool 7, 13 to processing tool 10, 18 can be relatively smooth (i.e., substantially free of significant acceleration and/or jerk). The smooth transfer or workpiece 3 can also substantially reduce the risk of damaging workpiece 3 and can also permit the transfer of relatively delicate workpieces in some applications.

In various embodiments, the machine-readable instructions can be configured to cause processor 224 to generate signals 58 useful in controlling at least some aspect of the processing of the workpiece 3. For example, such processing can include one or more value-added operations that can be carried out by processing tool 10, 18. Such value-added operation can include the assembly of two or more or workpieces 3 together. Such operation or other operations associated with part-processing device 110 can also be electronically synchronized with one or more of workpiece presentation tool 7, 13 and processing tool 10, 18 and can also operate as a master device or as a slave device depending on the specific application. Accordingly, the machine-readable instructions may, for example, be configured to cause processor 224 to generate signals 58 useful in causing electronic camming of the processing of workpiece 3 and one or more operations associated with workpiece presentation tool 7, 13 and processing tool 10, 18. Alternatively, one or more operations conducted by workpiece presentation tool 7, 13 or processing tool 10, 18 can be under binary control rather than direct electronic synchronization. However, in some embodiments, the triggering of an operation via a binary control signal can be dependent on the position of the master device and can still be based on the cam profile.

As explained above, part-processing device 110 can include one or more servo-motors associated with workpiece presentation tool 7, 13 and one or more servo-motors associated with processing tool 10, 18. Accordingly, the machine-readable instructions can be configured to cause processor 224 to generate signals useful in controlling the one or more servo-motors associated with workpiece presentation tool 7, 13 and the one or more servo-motors associated with processing tool 10, 18 according to a predetermined cam profile.

Figure 4:
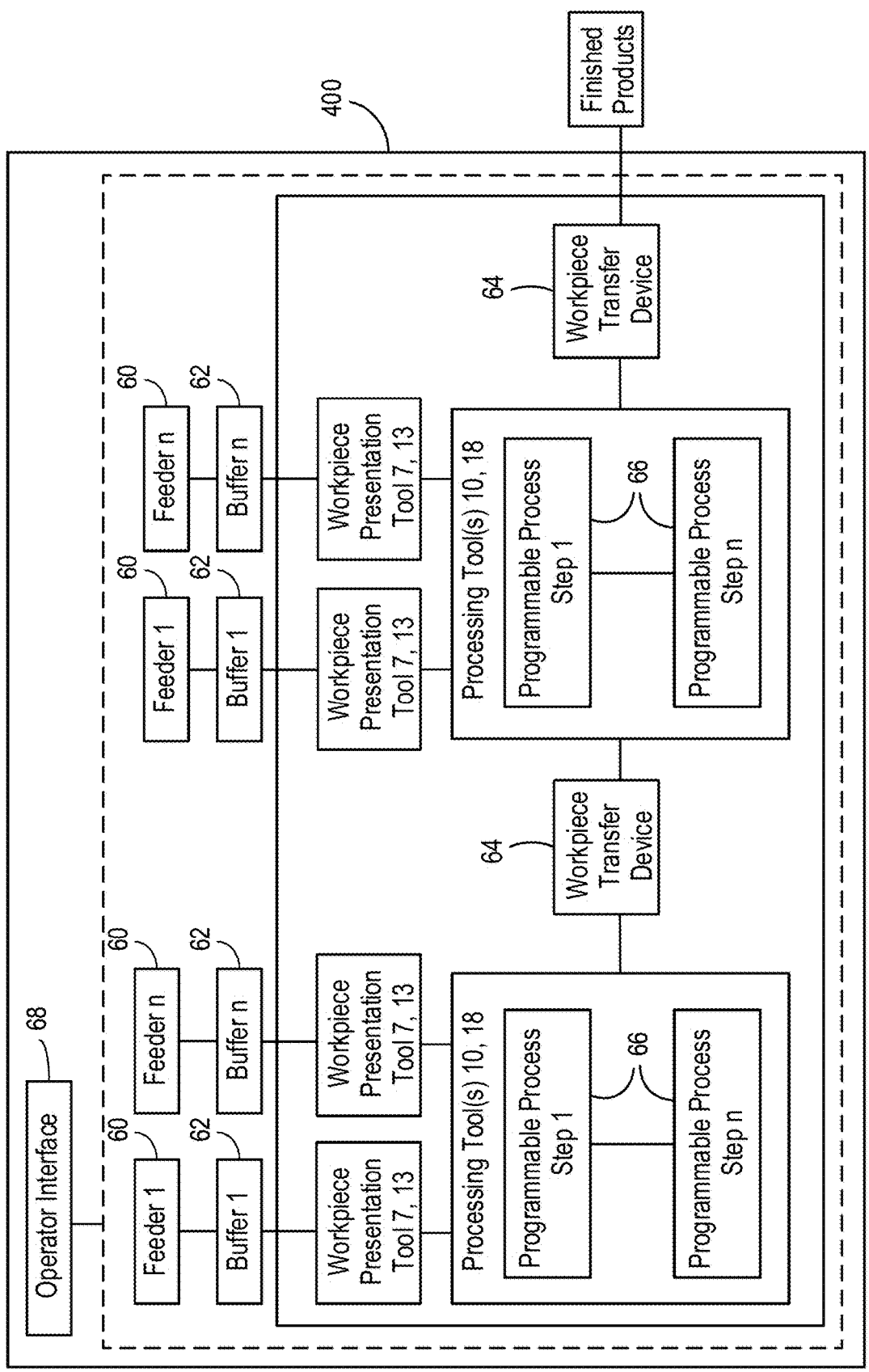
FIG. 4 is a schematic diagram of an example system for processing workpieces using asynchronous feeding of workpieces.
Figure 5:
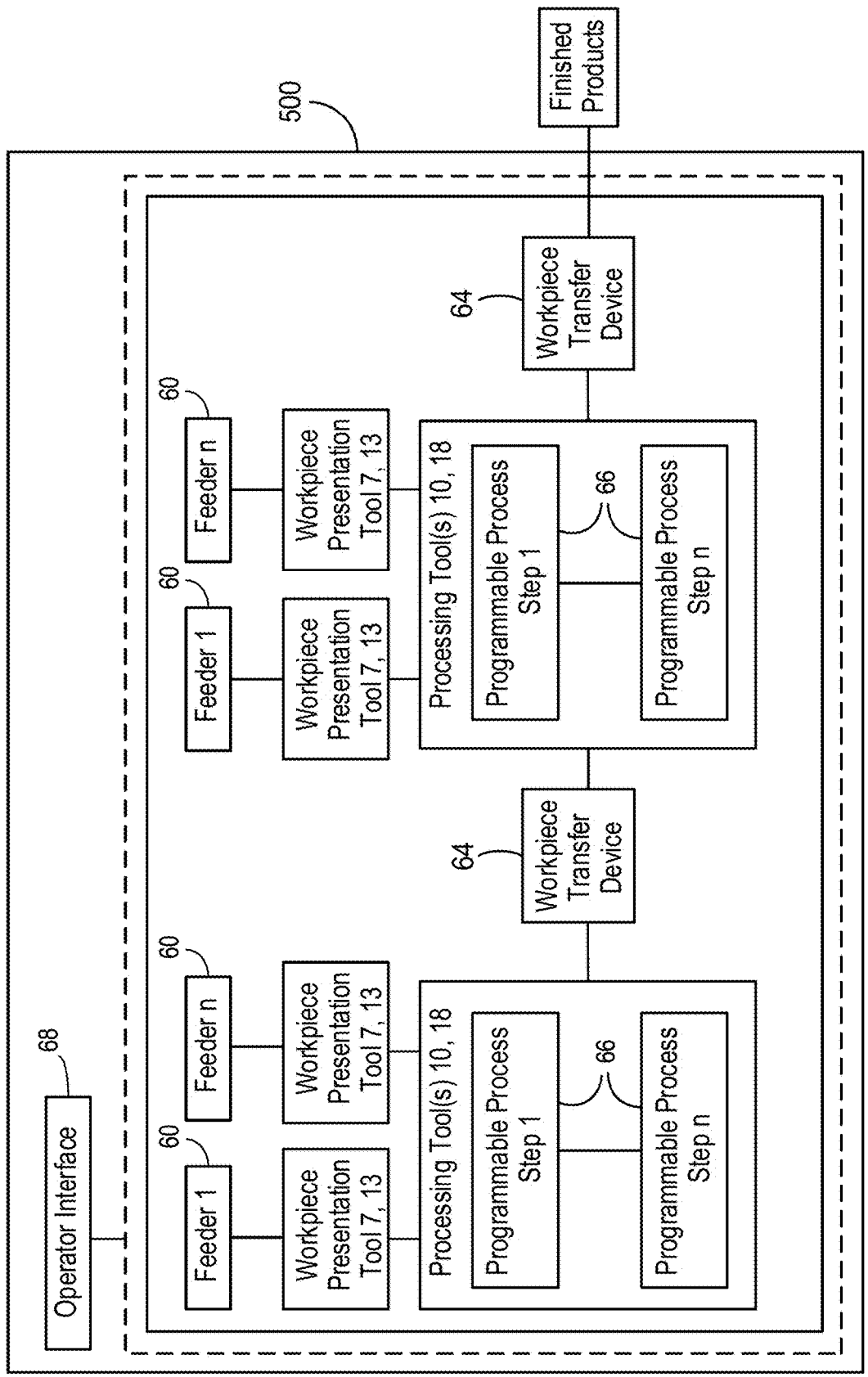
FIG. 5 is a schematic diagram of an example system for processing workpieces using synchronous feeding of workpieces.

Reference is now made to FIG. 4, which shows a schematic diagram of an example system 400 for processing workpieces using asynchronous feeding of workpieces and FIG. 5 is a schematic diagram of an example system 500 for processing workpieces using synchronous feeding of workpieces. Systems 400 and 500 can have similarities with part-processing device 110 explained above. In some embodiments, part-processing device 110 can be incorporated in whole or in part into one or both of systems 400 and 500. Systems 400 and 500 can be implemented in automated production station 100.

Systems 400 and 500 can be configured to carry out steps from or entire methods disclosed herein. Systems 400, 500 can receive workpieces 3 and/or other raw materials as inputs; progressively add value to them via one or more processing tools 10, 18; and finally discharges them either as discrete finished products, as unfinished products or as rejected scrap (i.e., defective products).

Accordingly, systems 400 and 500 can receive raw materials and/or workpieces 3 from one or more feeders 60. One or more feeders can be a track, or other devices configured to deliver its raw materials or workpieces 3 to one or more workpiece presentation tools 7, 13. The delivery from the feeders 60 can be done directly or via a respective buffer 62. Each workpiece presentation tools 7, 13 or a workpiece transfer device 64 can be numerically controlled and configured to deliver raw materials or workpieces to one or more processing tools 10, 18.

Each processing tool 10, 18 can test a workpiece 3 (i.e., part, component or work-in-progress) via one or more programmable process steps 66. A given processing tool 10, 18 can operate in parallel to and/or in series with one or more other processing tools 10, 18. Once the workpiece 3 passes through a final processing tool 10, 18, it can be discharged either as a successfully validated finished product or as rejected scrap, as described in more detail herein. Human interaction with systems 400 and 500 can be done via operator interface 68.

The various elements described above can be controlled at least in part by software resources known as base software backplane. The backplane can be configured to permit various elements of system to carry out various control functions including: management of inputs and outputs; management of local control tasks, including programmable process steps 66 within processing tools 10, 18 and local inspection tasks within validation stations 70; communications between different elements in system 400, 500 and communication with a human user via operator interface 68.

In system 400 of FIG. 5, feeders 60 may not be electronically synchronized with any other element or operation of system 400 and can be controlled by software backplane and the operation of feeders 60 can still be in harmony with other elements of system 400. Accordingly, feeders 60 can supply workpieces 3 to workpiece presentation tools 7, 13 via buffers 62 (e.g., asynchronous feeding) and feeders 60 can be operated to keep a sufficient supply of workpieces 3 in respective buffers 62. Alternatively, in system 500 of FIG. 5, feeders 60 can be electronically synchronized with one or more element or operation of system 500 and can under the control of a master device for example in order to provide synchronous feeding of workpieces 3 directly (i.e., without buffers) to workpiece presentation tools 7, 13.

At least part of part-processing device 110 and systems 400, 500 can include a numerically synchronized control architecture. In various embodiments, workpiece transfer devices 64, workpiece presentation tools 7, 13 and processing tools 10, 18 can be numerically controlled. Accordingly, movements of workpieces 3 such as raw materials and work-in-process through systems 400 and 500 can occur along programmable axes of motion, which can be either rotary or linear. Movement of tooling associated with programmable process steps 66 of processing tools 10, 18 can also take place along programmable linear and/or rotary axes of motion.

Figure 6:
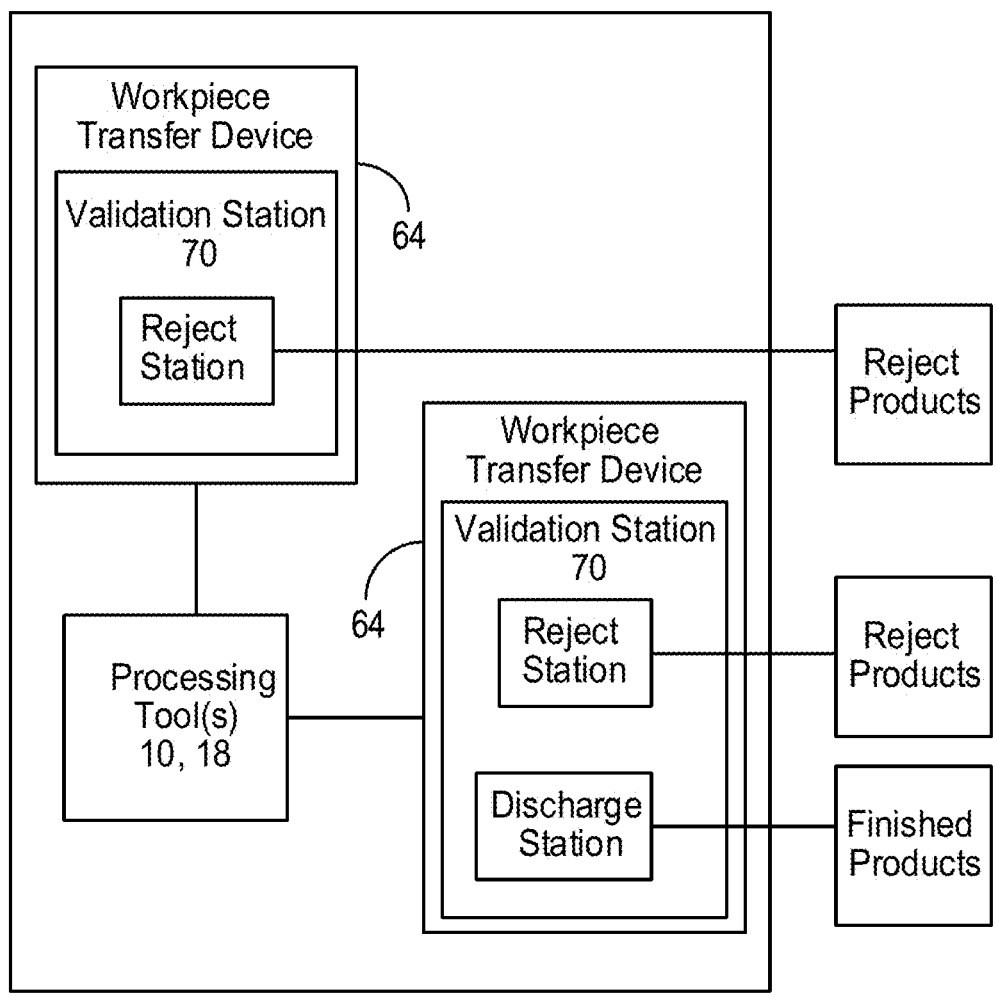
FIG. 6 is a schematic diagram of example workpiece transfer devices including validation stations.

Reference is now made to FIG. 6, which shows a schematic diagram of example workpiece transfer devices 64 including validation stations 70. Validation stations 70 can located at one or more feeders 60, workpiece presentation tools 7, 13, workpiece transfer devices 64 and/or processing tools 10, 18.

Validation stations 70 can receive information from part processing devices 110 in order to process workpieces 3 which have failed a flow test. At these points, such workpieces 3 can be eliminated from system 400, 500 as scrap if they do not meet one or more predetermined flow test criteria.

Figure 7:
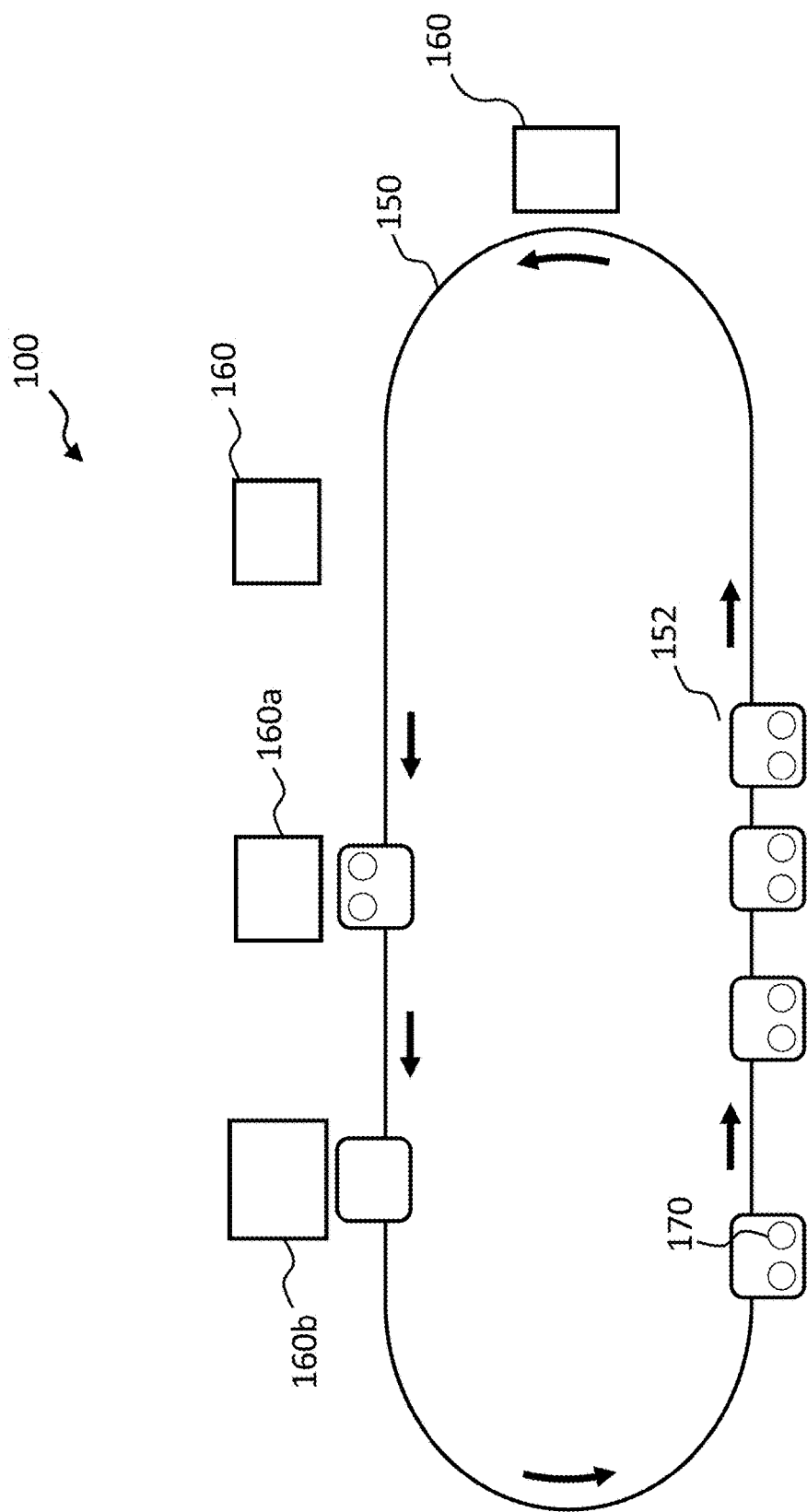
FIG. 7 is a schematic diagram showing an example arrangement of a plurality of part processing stations of the system of FIG. 1.

Referring to FIG. 7, an example arrangement of flow testing station 160a and validation station 160a of the system 100 is shown schematically. In the illustrated example, the system 100 includes a transport track 150 supporting a plurality of presentation pallets 152. A non-limiting example of such a track system is the Applicant's SuperTrak Conveyance™ system. Each presentation pallet 152 is configured for holding at least one workpiece 170 and is movable along the track 150 among a plurality of processing stations 160. Each processing station 160 includes one or more production devices 110 operable in electronic synchronization with each other, the carriers 152, and/or production devices 110 of other processing stations 160 for processing the workpieces.

In the example illustrated, the processing stations 160 shown in FIG. 7 include the flow testing station 160a for performing a flow test in accordance with the present disclosure. The validation station 160b of the system 100 shown in FIG. 7 is arranged to receive flow test information generated by the flow tests carried out at the flow testing station 160*a*. The flow test information can include information indicating whether a particular flow test has been passed or failed by a workpiece 3. The validation station 160*b* can be arranged to eliminate from system 100 as scrap workpieces 3 that do not meet one of more predetermined flow test criteria.

Figure 8A:
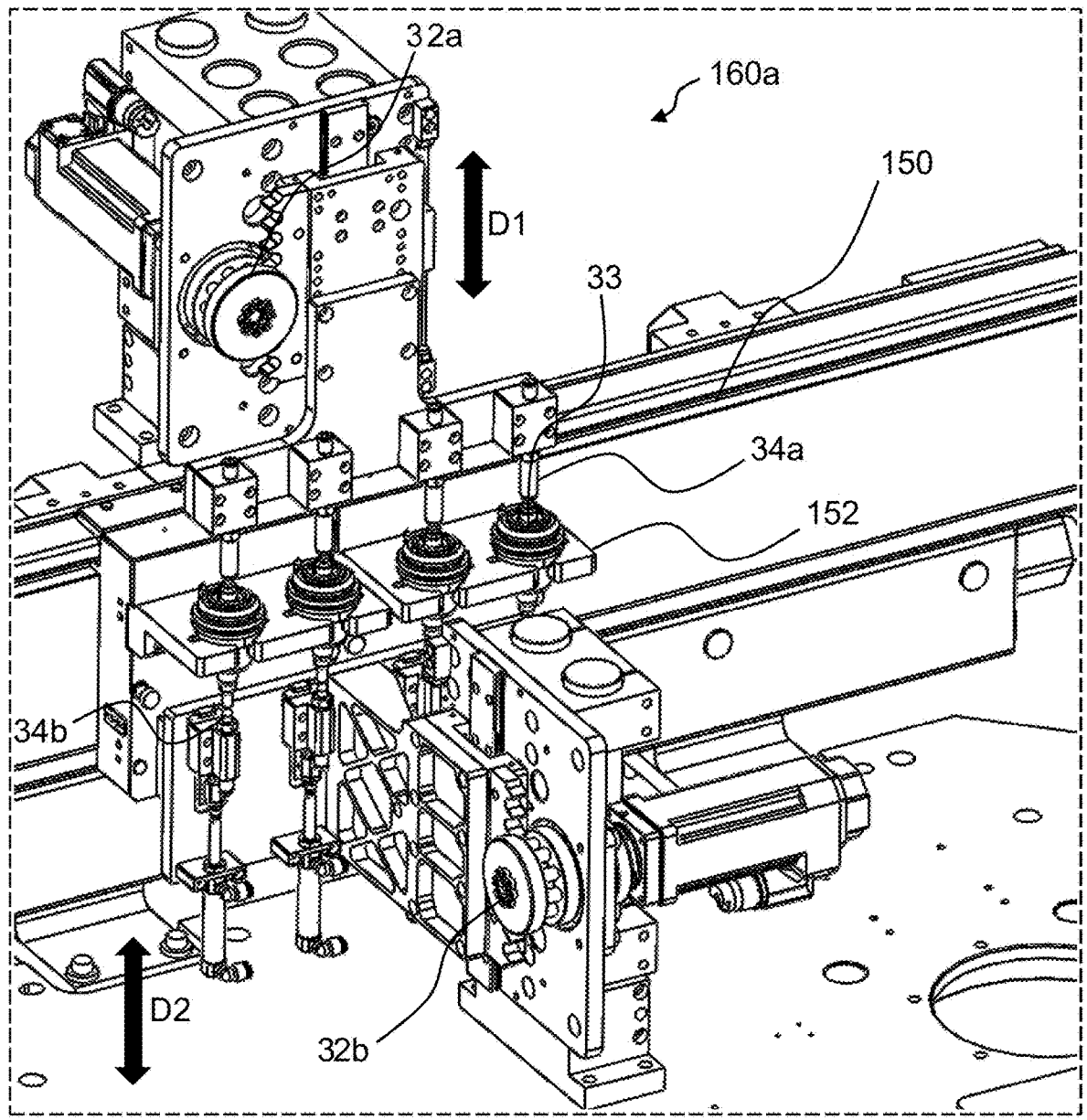
FIGS. 8A-8G show a perspective view of an example part-processing device performing flow tests on workpieces in accordance with the present disclosure.

FIGS. 8A-8G show a perspective view of an example part-processing device performing flow tests on work pieces in accordance with the present disclosure. The flow testing station 160*a* shown in FIG. 8A is disposed on a track 150. The track 150 comprises one or more pallets 152 arranged to hold and present workpieces 33. The track 150 is an example of a feeder 60, as described in more detail herein. The pallets 152 are examples of component presentation tools 7, 13, as described in more detail herein.

In the example shown in FIG. 8A, the workpieces are pump assemblies, for use in hand lotion, conditioner or sanitizer dispensers and the like. As will be appreciated, workpieces can be any other type of pump assembly, valve assembly, closure assembly, spray actuator assembly or other orifice for use in dispensing products and the like.

In some embodiments, each pallet 152 is initially loaded with pump assembly workpieces 33, on mounts that are designed to hold the workpieces in a specified rotational orientation. The mounts can easily be removed and replaced depending on the type of workpieces being handled and processed, and the required orientation (e.g., vertical or horizontal) of the workpieces for processing tools 10, 18 of a given automated testing station.

Each pallet 152 is handled and processed as an individual workpiece and handling of individual workpieces 33 is limited thereby maintaining the orientation and avoiding damage from contact during handling. Pallets 152 can be loaded with workpieces 33 by a pick and place robot, by manual labor, during the plastic molding process or by other automated means. The example illustrated in FIGS. 8A-8G shows two workpieces 33 per pallet 152. It will be understood that the standardized use of a platform with replaceable mounts permits variations such as mounting of any number of different components in multiple rows and columns, as well as different orientations, depending on the processing or assembly required.

As such, the skilled reader will understand that other types of components can be flow tested using the systems and methods described herein. The workpieces 33 being tested generally have an inlet in fluid communication with an outlet. In some embodiments, the processing tools 10, 18 of the flow testing station 160*a* are arranged to actuate a workpiece (e.g., pump assembly or spray actuator) before performing the flow test. In such embodiments, actuation of the workpiece is required to fluidly connect the inlet and the outlet of the component. In other embodiments, a workpiece (e.g., an open orifice) can be flow tested without the need for actuation. As defined herein, the terms "inlet" and "outlet" of a workpiece are defined as the inlet and outlet of a workpiece for the purposes of a flow test and not necessarily of as the inlet and outlet of the workpiece as used when assembled in a finished product.

The flow testing station 160*a* shown in FIG. 8A comprises a plurality of top sealing heads 34*a* generally disposed above workpieces 33 that are to be tested, and which arrive at and are presented to the flow testing station 160*a* on pallets 152. In the example shown in FIG. 8A, the flow testing station 160*a* comprises four top sealing heads 34*a* that are arranged to move together towards and away from workpieces 33. The plurality of top sealing heads 34*a* are movable in the generally vertical direction shown by arrow D1 in FIG. 8A, in order to engage and disengage an inlet or an outlet of workpieces 33. In some embodiments, the top sealing heads 34*a* are movable be way of mechanism 32*a*.

The flow testing station 160*a* shown in FIG. 8A also comprises a plurality of bottom sealing heads generally disposed below workpieces 33 that are to be tested, and which arrive at and are presented to the flow testing station 160*a* on pallets 152. In the example shown in FIG. 8A, the flow testing station 160*a* comprises four bottom sealing heads 34*a* that are arranged to move together towards and away from workpieces 33. The plurality of bottom sealing heads 34*b* are movable in the generally vertical direction shown by arrow D2 in FIG. 8A, in order to engage and disengage an outlet or an inlet of workpieces 33. In some embodiments, the bottom sealing heads 34*b* are movable be way of mechanism 32*b*. The top sealing heads 34*a* and bottom sealing heads 34*b* are examples of processing tools 10, 18, and are controlled as described herein.

The flow testing station 106*a* shown in FIGS. 8A to 8G is configured to handle and process two pairs of workpieces 33 that are initially mounted on two standardized pallets 152. As will be appreciated, other arrangements and configuration are possible using the systems and methods described herein.

With reference to FIGS. 8A-8B, 9, 10, 11 and 12, the operation of the example flow testing station 160*a* will now be described. In the example described with reference FIGS. 8A-8B, 9, 10, 11 and 12, the workpiece 33 is a pump assembly for a dispenser, such as a hand lotion dispenser or a sanitizer dispenser.

In the example described with reference to FIGS. 8A-8B, 9, 10, 11 and 12, two sequential flow tests are performed on each workpiece 33. A first flow test is performed on the pump assembly while the pump assembly is actuated (i.e., when the inlet and outlet are in fluid communication with each other), and a second flow test is performed on the pump assembly while the pump assembly is not actuated (i.e., when the inlet and the outlet should not be in fluid communication with each other). As such, the pump assembly can be tested to ensure that it provides proper flow when actuated and to ensure that it does not leak when not actuated.

FIG. 8A shows a flow test being performed on two pallets 152 while other pallets 152 travel along the track 150 from other stations in the system.

Figure 8B:
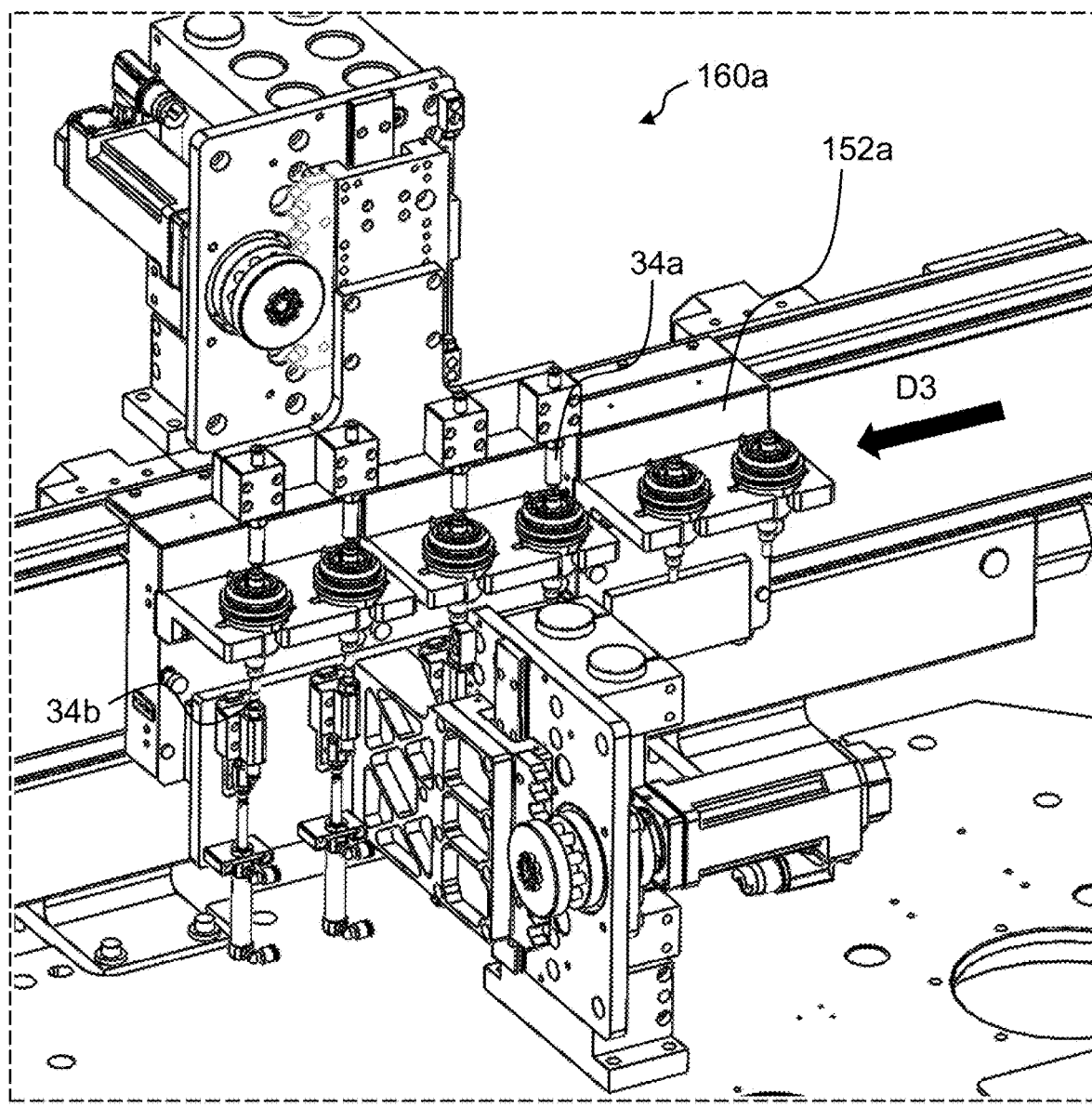

FIG. 8B shows a flow test continuing while a first pallet 152*a* arrives at the station and is staged in preparation for transfer into flow testing station 160*a*. The first pallet 152*a* arrives via direction D3.

Figure 8C:
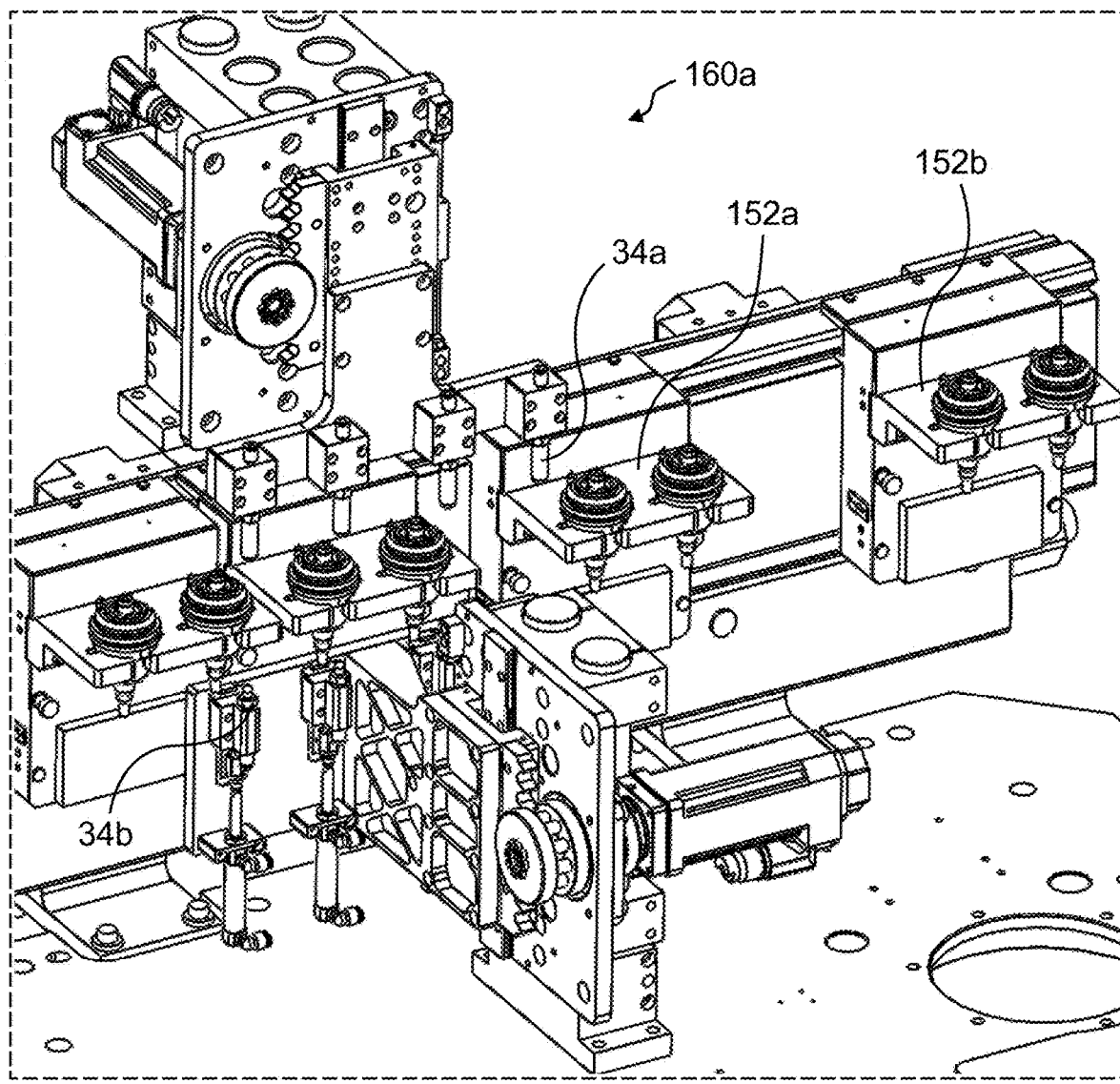
Figure 9:
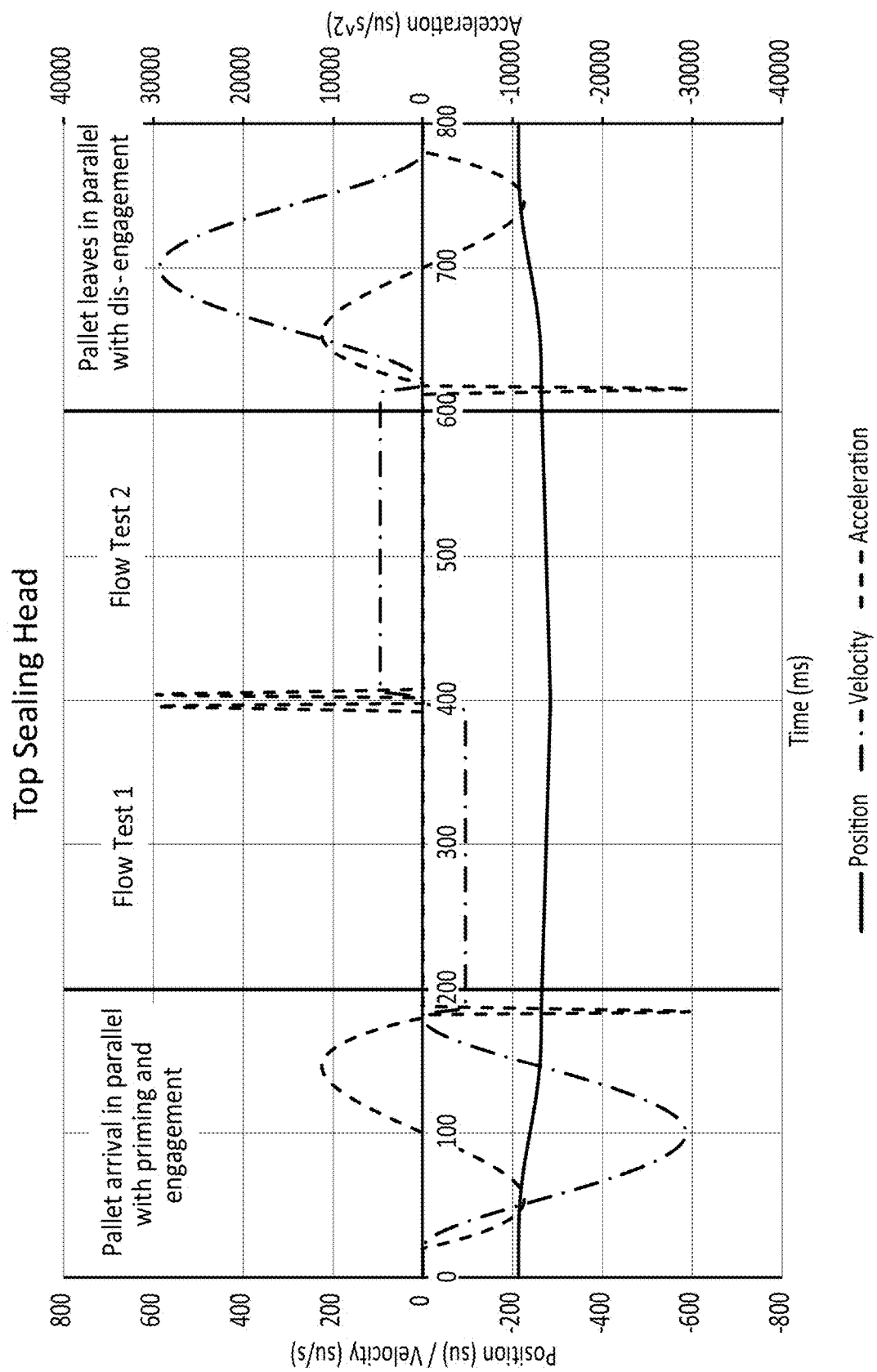
FIG. 9 is a plot of the position, velocity and acceleration of the top sealing head of the part processing device of FIGS. 8A-8G during consecutive flow tests.
Figure 10:
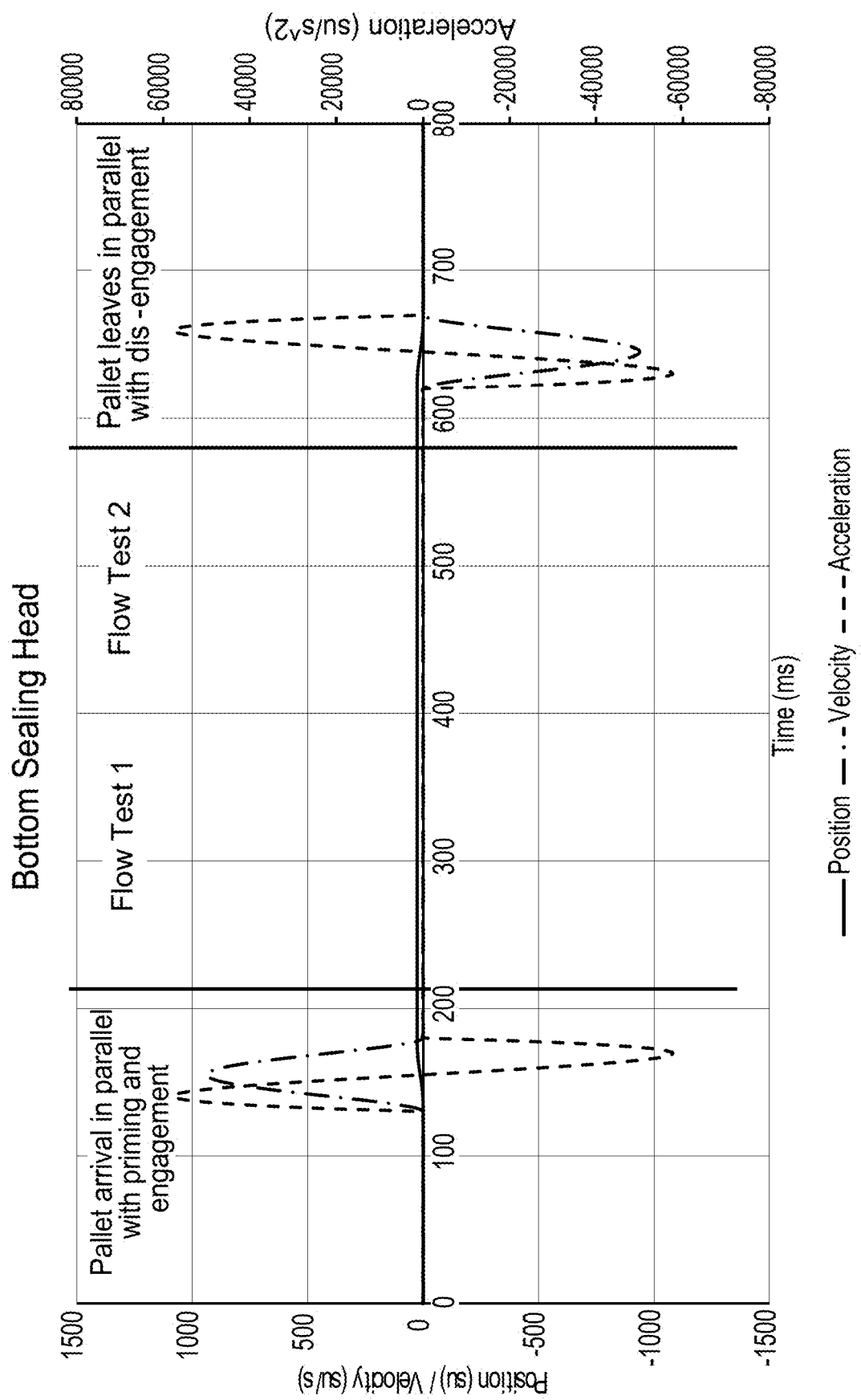
FIG. 10 is a plot of the position, velocity and acceleration of the bottom sealing head of the part processing device of FIGS. 8A-8G during consecutive flow tests.

FIG. 8C shows workpieces 33 previously tested move out of the flow testing station 160*a* after the four top sealing heads 34*a* and the four bottom sealing heads 34*b* have been disengaged from workpieces 33 following the movement shown in FIG. 9 and FIG. 10, respectively. At this point, the first pallet 152*a* leaves the staging area and moves toward the flow testing station 160*a*. Simultaneously, a second pallet 152*b* moves toward the flow testing station 160*a*.

Figure 8D:
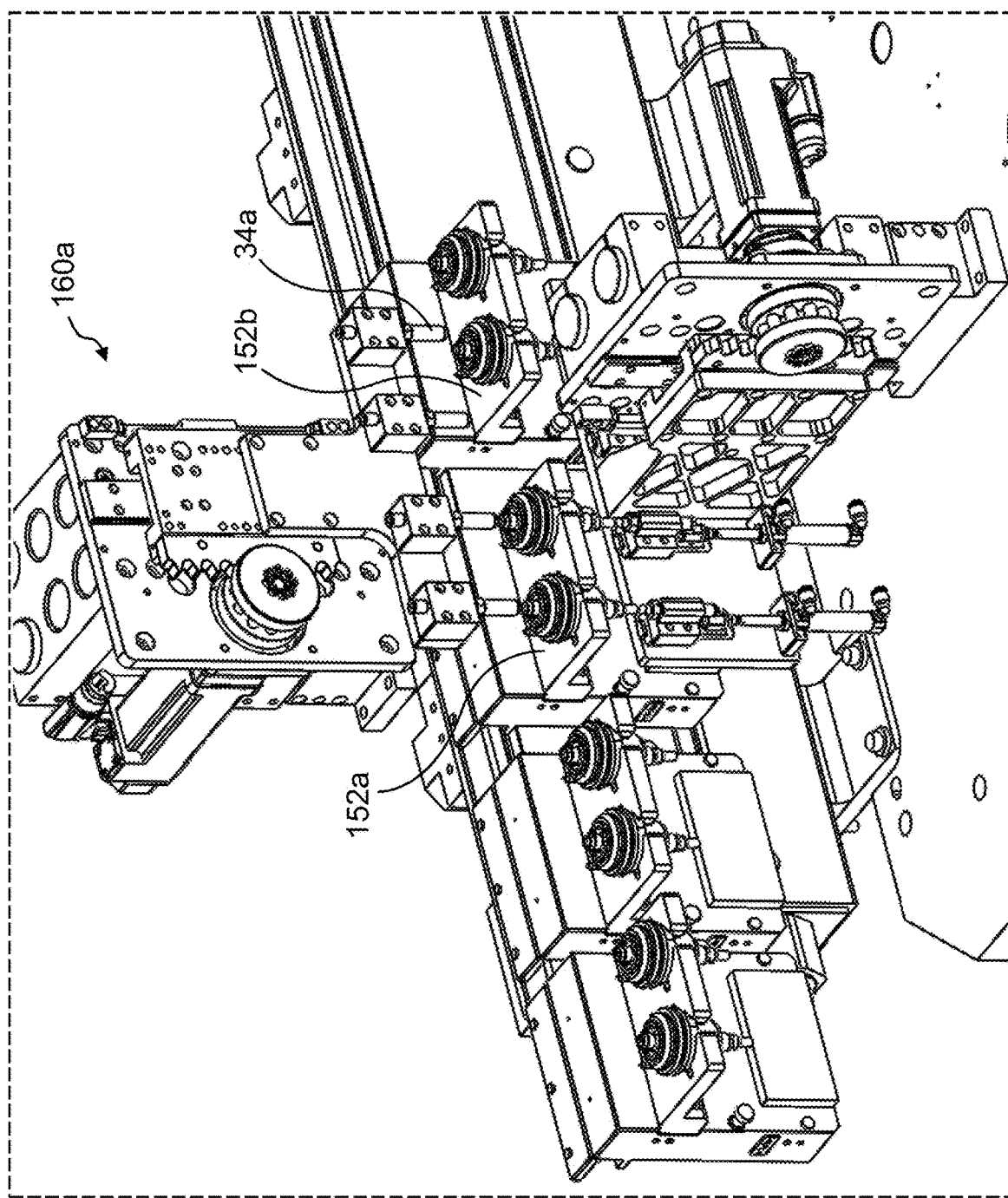

FIG. 8D shows the four workpieces 33 that were previously tested move out of the flow testing station 160*a* on two pallets 152. Simultaneously, the first pallet 152*a* is received by the flow testing station 160*a* and the second pallet 152*b* continues to travel toward the flow testing station 160*a*.

As soon the first pallet 152*a* is received by the flow testing station 160*a*, the four top sealing heads 34*a* begin to move down in anticipation of the receipt of the second pallet 152*b* and the four bottom sealing heads 34*b* begin to move up in anticipation of the receipt of the second pallet 152b. In the embodiment shown in FIGS. 8A-8G, top sealing heads 34a move in accordance with the graph shown in FIG. 9 and bottom sealing heads 34b move in accordance with the graph shown in FIG. 10.

During the motion of the sealing heads described above, the flow testing station 160a performs priming of the flow test. As shown in more detail in FIG. 13, priming includes starting the flow of gas through the top or bottom sealing heads. In some examples, priming can also include, but is not limited to, raising the pressure of the gas which is to be used in the flow test, activating sensors that are to be used in the flow test and preparing actuators that are to be used in the flow test.

Figure 8E:
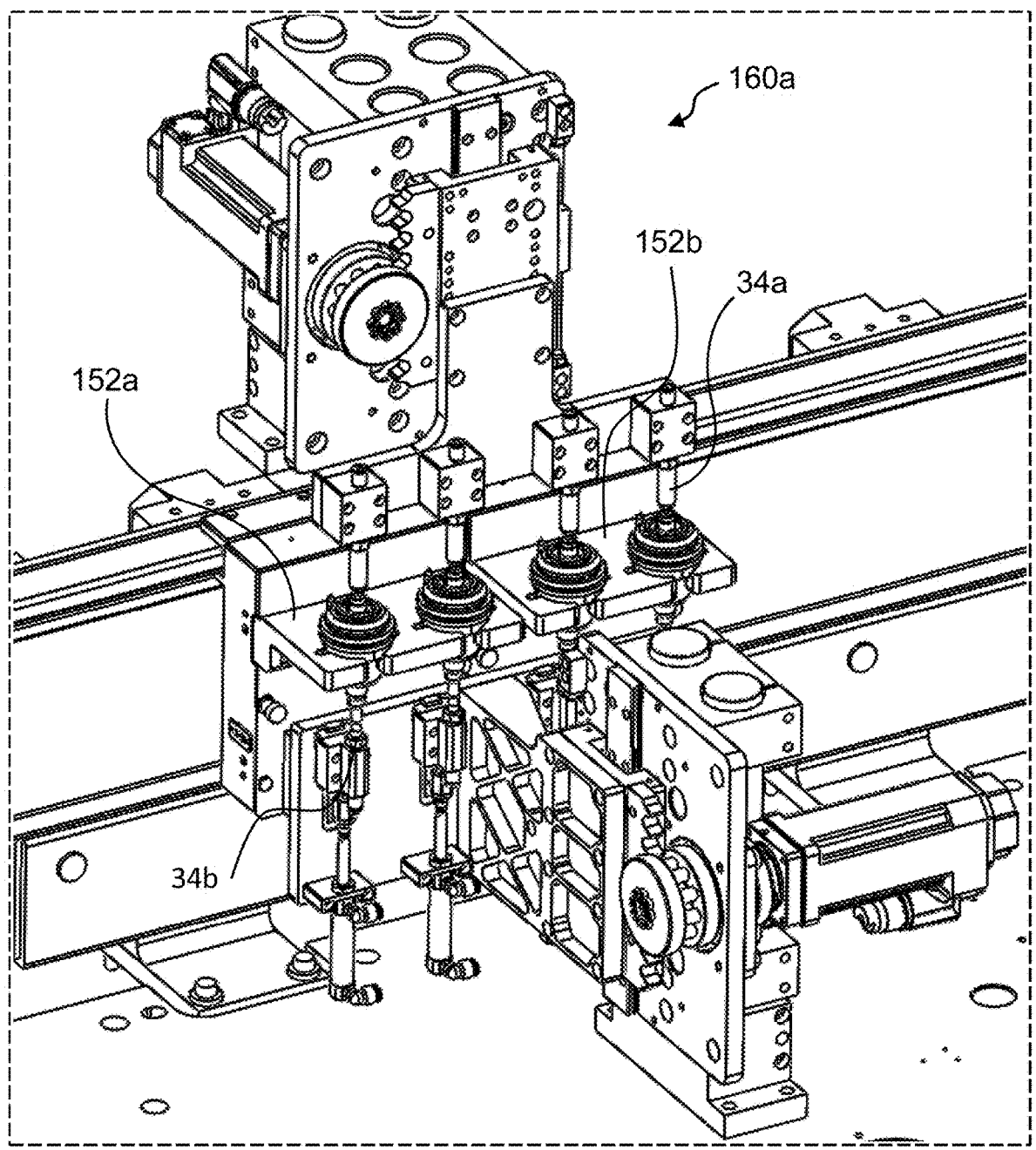

FIG. 8E shows the top sealing heads 34a and the bottom sealing heads 34b engage with workpieces 33 as the second pallet 152b is received at the flow testing station 160a. In some embodiments, the top sealing heads 34a and bottom sealing heads 34b engage with the inlets and outlets of the workpieces 33 in such a way as to form a seal. As such, the workpieces 33, when actuated, form flow paths extending between the top sealing heads 34a and the bottom sealing heads 33b. As used herein the terms "seal" and "sealed" are defined functionally and include any seal capable of allowing a flow test to be performed on the workpieces 33. As such, the term "seal" can include substantially hermetic seals as well as functionally suitable non-hermetic seals.

As described in more detail above, in some embodiments, the top sealing heads 34a and/or the bottom sealing heads 34b are arranged to engage with the workpieces 33 such as to actuate the component 33 and allow fluid to flow through them. In other embodiments, no actuation of workpieces 33 is required to carry out the flow test. In some embodiments, other processing tools 10, 18 of the flow testing station 160a may be used to actuate and disactuate workpieces 33.

Figure 8F:
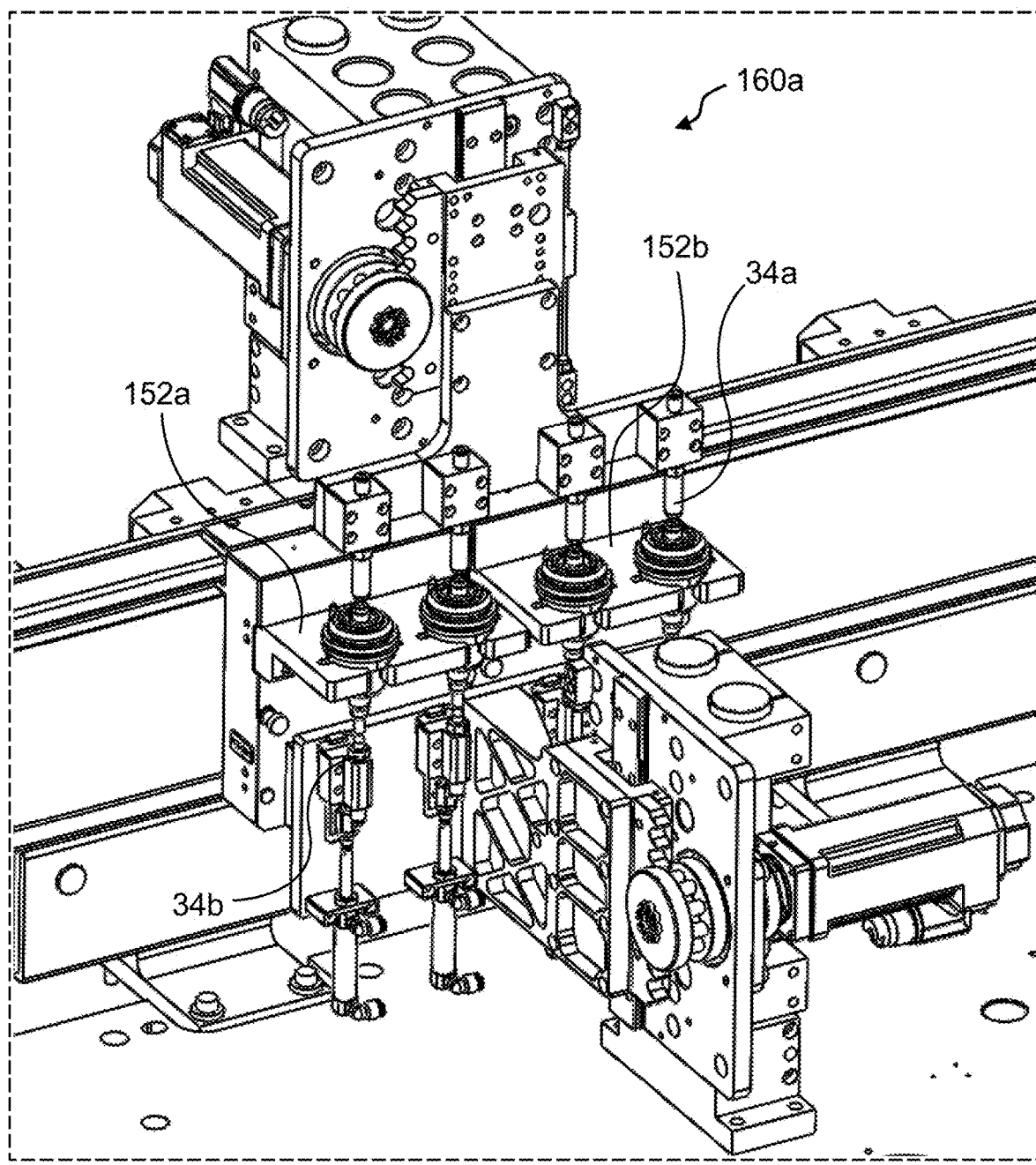
Figure 11:
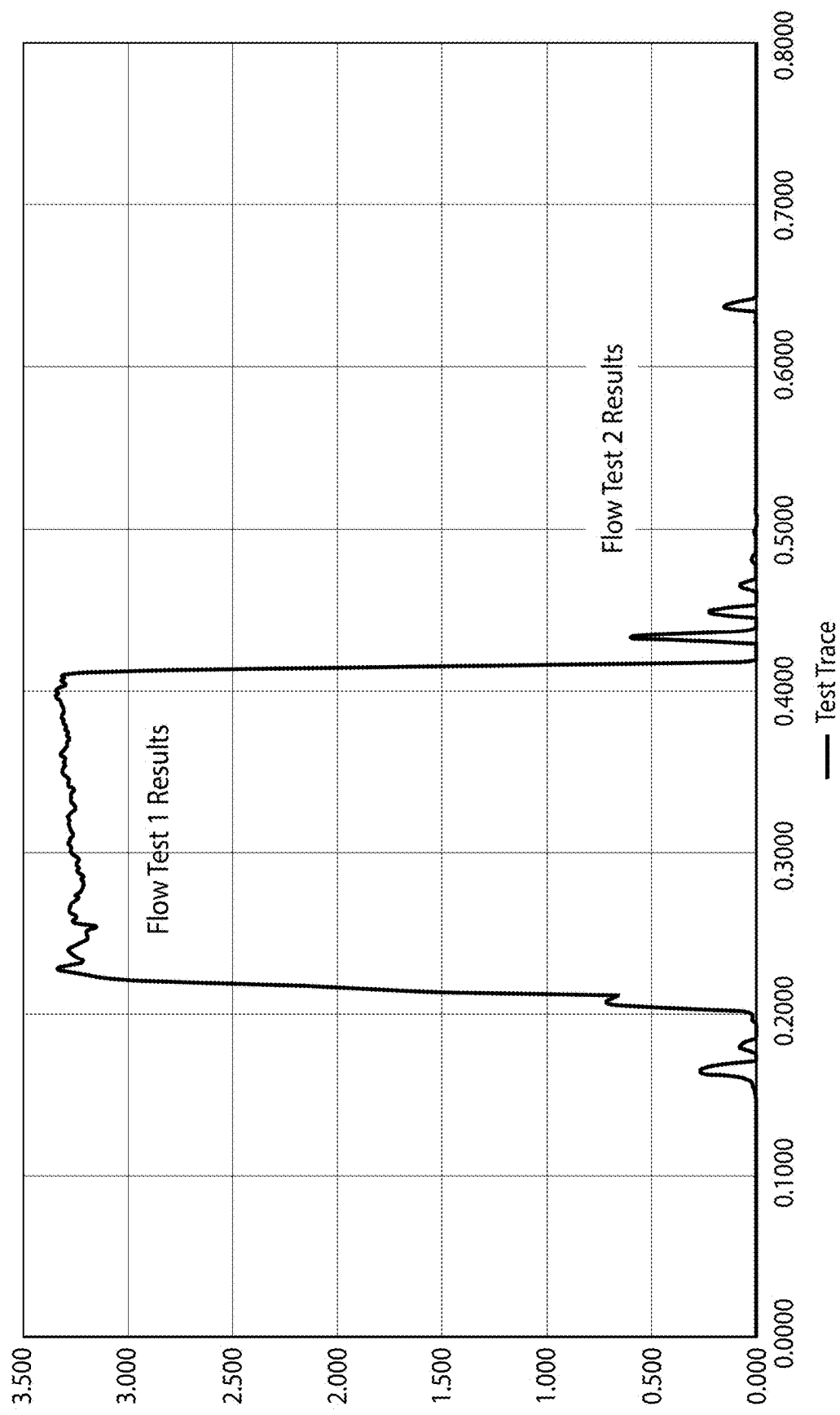
FIG. 11 is an example plot of the results of consecutive flow tests performed by the part processing device of FIGS. 8A-8G.
Figure 12:
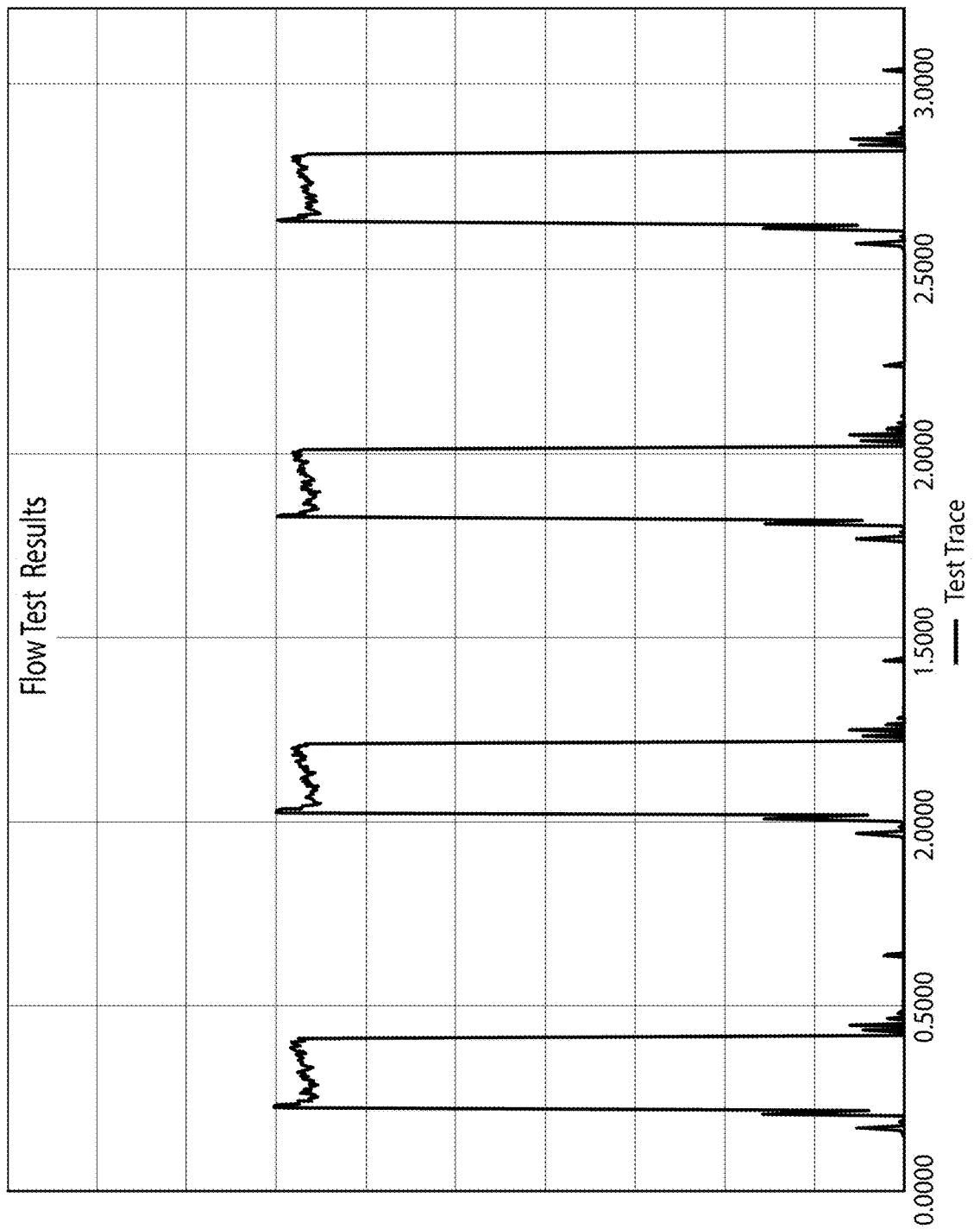
FIG. 12 is an example plot of multiple consecutive flow tests performed by the part processing device of FIGS. 8A-8G.

FIG. 8F shows the flow testing station engage with workpieces 33 such as to actuate the workpieces 33 to allow for fluid to flow through them, from inlets to outlets. The flow tests can be carried out by dispensing gas from the bottom sealing heads 34b, through the workpieces 33, into the top sealing heads 34a, where the flows of the gas received are measured. Alternatively, gas can be forced from the top sealing heads 34a, through the workpieces 33, to the bottom sealing heads 34b, where the flows of the gas received are measured. As shown in FIG. 11, the presence of a flow measured as a result of the first flow test indicates that the workpiece 33 being tested provides flow from its inlet to its outlet when actuated.

In some embodiments, as shown in FIGS. 9 to 11, once the first flow test is complete, the workpiece 33 can be disactuated by the top and bottom sealing heads and a second flow test can be performed. As shown in FIG. 11, the absence of a flow measured as a result of the second flow test indicates that the workpiece 33 being tested prevents flow from its inlet to its outlet when not actuated. All results described herein can be measured by a flow meter or any other suitable device.

Figure 8G:
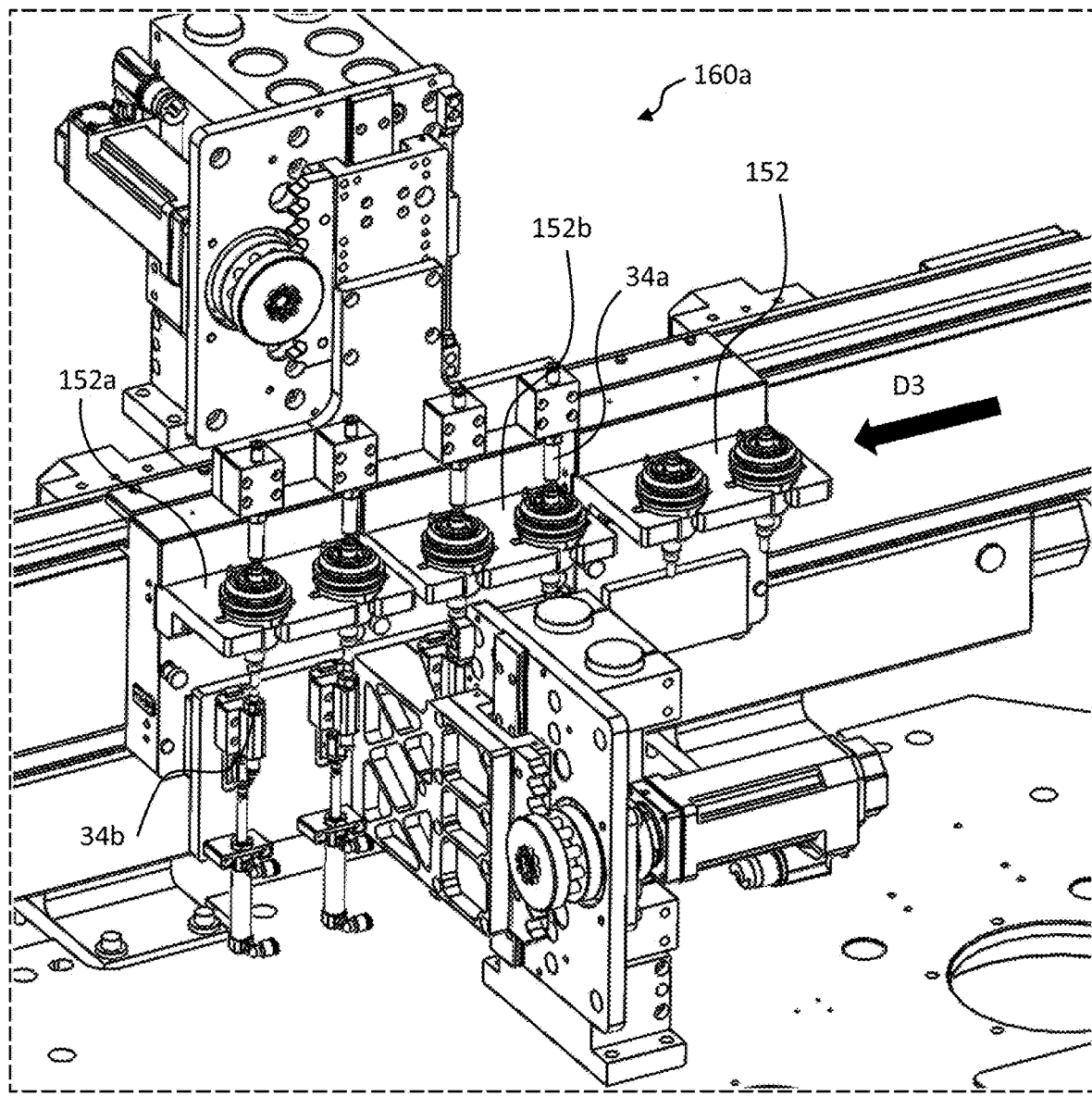

FIG. 8G shows the flow tests continuing while the next batch of pallets 152 stage in preparation for transfer into flow testing station 160a. As such, the cycle shown in FIG. 8A-8G is repeated.

Figure 13:
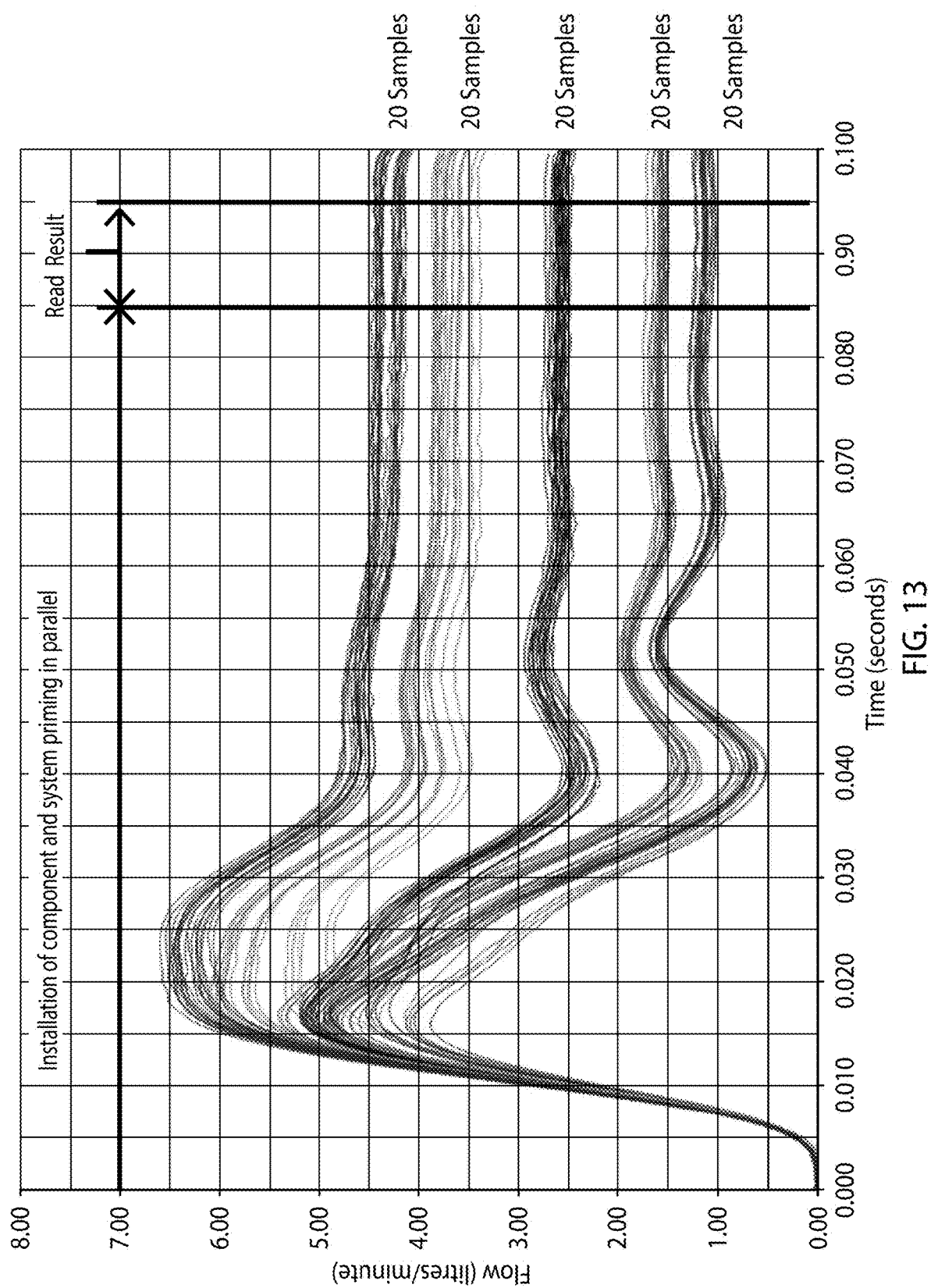
FIG. 13 is an example plot of multiple single flow tests performed by systems and methods described herein.

In some embodiments, the flow testing station of FIGS. 8A-8G can be configured to perform flow testing on workpieces that do not required actuation in order to create a flow path between an inlet and outlet of the workpiece. In such embodiments, a single flow test may be required. FIG. 13 is an example plot of multiple single flow tests performed by the systems and methods disclosed herein. In the embodiment of FIG. 13, the priming of the flow test is performed as described above, though only a single flow test is performed between engagement and disengagement of the top sealing heads 34a and the bottom sealing heads 34b with the workpieces.

As will be appreciated, applying the methods and systems described in FIGS. 1 to 6 to flow testing, as described in FIGS. 7 to 13, dramatically reduces the preparation and connection times and allows some functions to take place in parallel and remove latency, while maintaining process critical timing, which allows for fully inline flow testing.

In some embodiments, the flow testing station 160a may include one of more further processing tools 10, 18 dedicated to loading and assembling parts of the workpieces 33. In such embodiments, the loading and assembling steps can also be performed in accordance with the systems and methods of FIGS. 1 to 6. As such, flow test priming can be partially overlapped in time with loading and assembly operations.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the scope of the appended claims.

The invention claimed is:

1. A method of flow testing workpieces in an automated testing station having a plurality of processing tools, each workpiece including an inlet and an outlet, the inlet being in fluid communication with the outlet and the processing tools including, for each workpiece to be tested, a first and second sealing head, the method comprising:
 a) receiving at least one first workpiece at the automated testing station;
 b) moving the first and second sealing heads toward engagement positions;
 c) during b), priming a pressurized flow of gas from each of the first sealing heads to arrive at a flow threshold;
 d) during b) and c), receiving at least one second workpiece at the automated testing station;
 e) for each of the at least first and second workpieces, engaging the first sealing head with the inlet of the workpiece and the second sealing head with the outlet of the workpiece to form a sealed flow path from the first sealing head to the second sealing head; and
 f) performing at least one flow test including measuring at least one flow rate of gas flowing into each of the second sealing heads.

2. The method of flow testing in accordance with claim 1, wherein step e) of engaging the first sealing head with the inlet of the workpiece and the second sealing head with the outlet of the workpiece further comprises the steps of:
 i) actuating each workpiece with a processing tool to create the sealed flow path between the inlet and the outlet.

3. The method of flow testing in accordance with claim 2, wherein step f) of performing at least one flow test further comprises the steps of:
 ii) disactuating each workpiece with the processing tool to inhibit a flow path between the inlet and the outlet, and
 iii) performing at least one further flow test by measuring at least one flow rate of gas flowing into each of the second sealing heads while the workpiece is not actuated.

4. The method of flow testing in accordance with claim 2, wherein the step of actuating is performed by one or both of the first and second sealing heads.

5. The method of flow testing in accordance with claim 2, wherein each workpiece is one of a spray actuator assembly, a pump assembly, a valve assembly or a closure assembly.

6. The method of flow testing in accordance with claim 1, wherein the automated testing station further comprises processing tools for loading parts onto the workpieces and the method further comprises the step of loading one or more parts onto the workpieces.

7. The method of flow testing in accordance with claim 1, wherein the automated testing station further comprises processing tools for assembling parts of the workpieces and the method further comprises the step of assembling one or more parts of the workpieces.

8. The method of flow testing in accordance with claim 1, wherein the at least one first workpiece arrives at the automated testing station on a first presentation pallet and the at least one second workpiece arrives at the automated testing station on a second presentation pallet.

9. The method of flow testing in accordance with claim 1, wherein the automated testing station is part of an automated production line and wherein the method further comprises the steps of:
 g) for each workpiece, comparing flow rates measured at step f) with a reference flow rates to determine whether the workpiece is defective; and
 h) removing any defective workpieces from the automated production line.

10. The method of flow testing in accordance with claim 9, wherein the step of removing any defected workpieces from the automated production line is performed by a dedicated validation station situated downstream from the automated testing station in the automated production line.

11. An automated mass production system, comprising:
 a) a track including a plurality of carriers, each carrier holding at least one workpiece, each workpiece including an inlet and an outlet, the inlet being in fluid communication with the outlet, each carrier being advanceable along the track;
 b) an automated testing station having a plurality of processing tools, the processing tools including, for each workpiece to be tested, a first and second sealing head;
 c) a control system for synchronizing operation of the carriers and the automated testing station, the control system configured to:
  i) receive at least one first workpiece at the automated testing station;
  ii) move the first and second sealing heads toward engagement positions;

iii) during ii), prime a pressurized flow of gas from each of the first sealing heads to arrive at a flow threshold;

iv) during ii) and iii), receive at least one second workpiece at the automated testing station;

v) for each of the at least first and second workpieces, engage the first sealing head with the inlet of the workpiece and the second sealing head with the outlet of the workpiece to form a sealed flow path from the first sealing head to the second sealing head; and vi) perform at least one flow test including measuring at least one flow rate of gas flowing into each of the second sealing heads.

12. The automated mass production system in accordance with claim 11, wherein, when engaging the first sealing head with the inlet of the workpiece and the second sealing head with the outlet of the workpiece, the control system is further configured to actuate each workpiece with a processing tool to create the sealed flow path between the inlet and the outlet.

13. The automated mass production system in accordance with claim 12, wherein, when performing at least one flow test, the control system is further configured to:

vii) disactuate each workpiece with the processing tool to inhibit a flow path between the inlet and the outlet, and viii) perform at least one further flow test by measuring at least one flow rate of gas flowing into each of the second sealing heads while the workpiece is not actuated.

14. The automated mass production system in accordance with claim 12, wherein the step of actuating is performed by one or both of the first and second sealing heads.

15. The automated mass production system in accordance with claim 12, wherein each workpiece is one of a spray actuator assembly, a pump assembly, a valve assembly or a closure assembly.

16. The automated mass production system in accordance with claim 11, wherein the automated testing station further comprises processing tools for loading parts onto the workpieces and the control system is further configured to load one or more parts onto the workpieces.

17. The automated mass production system in accordance with claim 11, wherein the automated testing station further comprises processing tools for assembling parts of the workpieces and the control system is further configured to assemble one or more parts of the workpieces.

18. The automated mass production system in accordance with claim 11, wherein the at least one first workpiece arrives at the automated testing station on a first presentation pallet supported by a carrier and the at least one second workpiece arrives at the automated testing station on a second presentation pallet supported by a carrier.

19. The automated mass production system in accordance with claim 11, wherein the control system is further configured to, for each workpiece, compare flow rates measured at step vi) with reference flow rates to determine whether the workpiece is defective, and remove any defected workpieces from the production line of the automated mass production system.

20. The automated mass production system of claim 19, wherein the automated mass production system further comprises a validation station configured to receive commands from the control system to remove any defected workpieces from the automated production line.

* * * * *